(12) United States Patent
Okuda

(10) Patent No.: US 8,244,243 B2
(45) Date of Patent: Aug. 14, 2012

(54) COMMUNICATION CONTROL APPARATUS AND COMMUNICATION CONTROL METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/069,923

(22) Filed: Mar. 23, 2011

(65) Prior Publication Data

US 2011/0171957 A1 Jul. 14, 2011

Related U.S. Application Data

(63) Continuation of application No. PCT/JP2008/068590, filed on Oct. 14, 2008.

(51) Int. Cl.
*H04W 4/00* (2009.01)
(52) U.S. Cl. .................. 455/435.1; 455/456.1
(58) Field of Classification Search ........................ None
See application file for complete search history.

(56) References Cited

U.S. PATENT DOCUMENTS

| | | | | |
|---|---|---|---|---|
| 5,361,396 | A * | 11/1994 | Onoe et al. ................. | 455/435.1 |
| 2005/0070283 | A1 | 3/2005 | Hashimoto et al. | |
| 2008/0057955 | A1* | 3/2008 | Choi-Grogan ............. | 455/435.1 |
| 2010/0069062 | A1* | 3/2010 | Horn et al. .................... | 455/434 |

FOREIGN PATENT DOCUMENTS

| | | |
|---|---|---|
| JP | 08-265828 | 10/1996 |
| JP | 2005-109570 | 4/2005 |

OTHER PUBLICATIONS

International Search Report and Written Opinion issued for corresponding International Patent Application No. PCT/JP2008/068590, mailed Nov. 18, 2008. Partial English translation of Written Opinion attached.
IEEE Computer Society and the IEEE Microwave Theory and Techniques Society; Sponsored by LAN/MAN Standards Committee; IEEE Standard for Local and metropolitan area networks; Part 16: Air Interface for Fixed Broadband Wireless Access Systems; IEEE Std 802.16TM-2004 (Revision of IEEE Std 802.16-2001); IEEE 3 Park Avenue, New York, NY 10016; Dated Oct. 1, 2004.

(Continued)

*Primary Examiner* — Erika Gary
(74) *Attorney, Agent, or Firm* — Myers Wolin, LLC

(57) ABSTRACT

An ASN-GW that controls communication of a plurality of BSs of which each wirelessly accommodates MS includes a PGID management table that manages PG #1 to be set for macro BSs and PG #2 to be set for a femto BS, a location registration database that manages PGID of identifying PG in which the MS is currently located and last BSID of identifying BS that performs final location registration of the MS, and a GW-side control unit that transmits, upon receiving data for the MS, paging information through all the macro BSs under the PG #1 when the present position of the MS is the PG #1, and that transmits, upon receiving data for the MS, the paging information through the femto BS under the PG #2 based on the last BSID when the present position of the MS is the PG #2.

9 Claims, 16 Drawing Sheets

OTHER PUBLICATIONS

IEEE Computer Society and the IEEE Microwave Theory and Techniques Society; Sponsored by the LAN/MAN Standards Committee; IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Std 802.16eTM-2005 and IEEE Std 802.16TM-2004/Cor1-2005; IEEE 3 Park Avenue, New York, NY 10016; Dated Feb. 28, 2006.

Ming-Hung Tao et al.; "Location-Based Paging Mechanism in 16m"; IEEE C802.16m-08/579r2, dated Jul. 7, 2008.

Ming-Hung Tao et al.; "Location-Based Paging Mechanisum in 16m"; IEEE S802.16m-08/579r1, dated Jul. 7, 2008.

* cited by examiner

COMMUNICATION CONTROL APPARATUS AND COMMUNICATION CONTROL METHOD

CROSS REFERENCE TO RELATED APPLICATIONS

This is a continuation of Application PCT/JP2008/068590, filed on Oct. 14, 2008, now pending, the contents of which are herein wholly incorporated by reference.

TECHNICAL FIELD

The present invention relates to a communication control apparatus that uses base stations (hereinafter, "BS") of which each wirelessly accommodates a mobile subscriber (hereinafter, "MS"), a communication control method, and a communication control program. As an application example of a base station, the base station includes a normal macro base station (hereinafter, "macro BS") and an ultracompact femto base station (hereinafter, "femto BS").

BACKGROUND ART

The IEEE 802.16 working group has recently defined a Point-to-Multipoint (hereinafter, "P-MP") communication method by which a plurality of MSs can be connected to BS.

Moreover, the IEEE 802.16 working group has defined two kinds of applications of the 802.16d specification (802.16-2004) for fixed communication and the 802.16e specification (802.16e-2005) for mobile communication.

A wireless communication system that employs the IEEE 802.16d/e mainly employs an orthogonal frequency division multiplex (OFDM) system and an orthogonal frequency division multiplexing access (OFDMA) system.

FIG. 14 is a block diagram illustrating the schematic configuration of a wireless communication system 100 that employs IEEE 802.16d/e.

The wireless communication system 100 illustrated in FIG. 14 includes Internet 101, an access service network (hereinafter, "ASN") 104 that accommodates and connects a plurality of macro BSs 103A of which each wirelessly accommodates a plurality of MSs 102, and a connectivity service network (hereinafter, "CSN") 105 that connects the Internet 101 and the ASN 104 for communication.

The ASN 104 further includes an ASN gateway (hereinafter, "ASN-GW") 106 that takes charge of a communication interface between the CSN 105 and the ASN 104 and that transfers packets in Layer 2, in addition to the plurality of macro BSs 103A. Moreover, the CSN 105 routes packets and transfers the packets in Layer 3.

A femto BS that is made by downsizing the macro BS 103A is being recently developed. In this way, there is devised a technology for placing a femto BS in a standard home or an office that has a bad radio wave environment and connecting the femto BS and the ASN 104 by way of an Internet service provider (hereinafter, "ISP") and the Internet 101.

FIG. 15 is a block diagram illustrating the schematic configuration of a wireless communication system 100A that uses a femto BS. The same configuration as that of the wireless communication system 100 illustrated in FIG. 14 has the same reference numbers, and thus the explanation of the same configuration and operation is omitted.

The wireless communication system 100A illustrated in FIG. 15 includes a femto BS 103B that is placed in, for example a standard home or an office and wirelessly accommodates the MS 102.

The femto BS 103B is connected to an ISP 108 through an asymmetric digital subscriber line (hereinafter, "ADSL line") and an optical fiber line, and is connected to the ASN 104 for communication directly or by way of the Internet 101 from the ISP 108.

Moreover, the ASN 104 includes a femto GW 109 that takes charge of a communication interface with the femto BS 103B by way of the ISP 108 and/or the Internet 101.

The femto GW 109 uses an IP security (hereinafter, "IPsec") to realize an encryption communication with the femto BS 103B for preventing eavesdropping and interpolation of data and to assure the security of the ASN 104.

FIG. 16 is a block diagram illustrating the schematic configuration of a wireless communication system 100B that uses the femto BSs 103B. The same configuration of the wireless communication system 100B as that of the wireless communication system 100A illustrated in FIG. 15 has the same reference numbers, and thus the explanation of the same configuration and operation is omitted.

The wireless communication system 100B illustrated in FIG. 16 provides the plurality of macro BSs 103A and the plurality of femto BSs 103B, which have geographically adjacent relationship, in the same paging group (hereinafter, "PG"). For convenience of explanation, the macro BS 103A and the femto BS 103B is generally named as a BS 103.

When a packet heading to the MS 102 wirelessly accommodated in the BS 103 in the same PG is received, the ASN-GW 106 instructs all the macro BSs 103A and all the femto BSs 103B in the same PG to transmit paging information of the MS 102.

Moreover, the MS 102 enables to set an idle mode. During the idle mode, a power consumption can be reduced because signals output from the macro BS 103A or the femto BS 103B need not be constantly received.

The ASN-GW 106 further includes a paging controller (hereinafter, "PC") unit that registers PG in which the MS 102 during an idle mode is located.

When a movement, which is a PG change, from the current-position PG to the BS 103 belonging to another PG is detected, the MS 102 requests the ASN-GW 106 to perform location registration in order to request to register new position information in a location registration database.

Because the BS 103 periodically sends its PGID to the underneath MS 102, the MS 102 detects a PG change caused by the movement of the MS 102 in accordance with the PGID output from the BS 103.

When the location registration request of the MS 102 is detected, the PC unit of the ASN-GW 106 registers new position information in the location registration database as the latest position information of the MS 102. Moreover, the location registration request of the MS 102 starts in accordance with the time-up of a timer (idle mode timer) that is managed by the MS 102, in addition to the case where the PG change caused by the movement of the MS 102 is detected.

Moreover, when a packet for the MS 102 during an idle mode is received, the ASN-GW 106 specifies the MS 102 from header information of the received packet and sends paging public information including a paging parameter and an identifier of identifying the specified MS 102 to all the BSs 103 in the PG in which the MS 102 is located.

Upon receiving the paging public information from the ASN-GW 106, each the BS 103 transmits paging information to the underneath MS 102.

FIG. 17 is an operating sequence diagram illustrating processing operations of the wireless communication system 100B that are associated with a basic location registration updating process.

When a starting timing of the location registration updating process is detected (Step S201), the MS 102 illustrated in FIG. 17 starts the location registration updating process. In this case, the starting timing starts, for example, in accordance with the detection of a PG change caused by the movement of the MS 102 or the time-up of the idle mode timer of the MS 102.

Upon detecting the starting timing, the MS 102 transmits a ranging request (hereinafter, "RNG-REQ") to the BS 103 (Step S202). In this case, RNG-REQ is a message that includes a location registration request flag (hereinafter, "LU request flag") of requesting the location registration updating process and a PCID of identifying the PC unit of the ASN-GW 106 associated with the MS 102.

Upon receiving the RNG-REQ, the BS 103 transmits a location registration request (hereinafter, "LU-Req") to the ASN-GW 106 that includes the PC unit associated with the PCID of the RNG-REQ (Step S203).

Upon receiving the LU-Req, the ASN-GW 106 updates and registers the present PGID of identifying the present PG in which the MS 102 is located, the last BSID of identifying the BS 103 that performs the final location registration, parameters, and the like in the location registration database (Step S204). Simultaneously, the ASN-GW 106 resets a clocking operation of a system-side idle mode timer that monitors the starting timing of the location registration updating process in the ASN-GW 106 side. In this case, the system-side idle mode timer performs time-up in a little longer time than that of the idle mode timer that is managed by the MS 102.

Furthermore, the ASN-GW 106 sends back a location registration request response (hereinafter, "LU-Rsp") for the LU-Req output from the BS 103 to the BS 103 (Step S205). In this case, LU-Rsp includes key information for calculating a cipher-based message authentication code (hereinafter, "CMAC) for authenticating RNG-REQ in the BS 103 side.

Upon receiving the LU-Rsp output from the ASN-GW 106, the BS 103 confirms the validity of RNG-REQ by authenticating CMAC on the basis of the key information of the LU-Rsp. When the validity is confirmed, the BS 103 transmits a ranging request response (hereinafter, "RNG-RSP"), which includes a flag indicating a location registration success and the present PGID, to the MS 102 (Step S206).

Furthermore, after the RNG-RSP is transmitted to the MS 102, the BS 103 sends back a location registration request confirmation (hereinafter, "LU-Confirm") to the PC unit of the ASN-GW 106 (Step S207).

On the other hand, when the validity of RNG-REQ cannot be confirmed at Step S206, the BS 103 transmits the RNG-RSP including a flag indicative of a location registration failure to the MS 102, and then sends back the LU-Confirm to the PC of the ASN-GW 106. Then, the ASN-GW 106 cancels the updating for location registration.

FIG. 18 is an operating sequence diagram illustrating processing operations of the wireless communication system 100B associated with a basic paging process.

Upon receiving the packet for the MS 102 during an idle mode (Step S211), the PC unit of the ASN-GW 106 illustrated in FIG. 18 transmits paging public information that includes a start code indicating a transmission start of paging information for the MS 102 to all the BSs 103 in the PG of the present PGID reported by the MS 102 at the location registration updating process (Step S212).

Upon receiving the paging public information including the start code, each the BS 103 transmits paging information (PAG-ADV) to the MS 102 that is a paging target (Step S213). Moreover, the paging public information and the paging information (PAG-ADV) include a MAC address, a hash value, and the like for specifying the MS 102 that is a paging target.

Moreover, until the paging public information including a stop code to be described below is received, the time-up of a paging public information timer included in the paging public information is performed, or the response to RNG-REQ is received from the MS 102, each the BS 103 continues to transmit the paging information (PAG-ADV) with a predetermined paging period.

Upon receiving the paging information including its own MAC address (or hash value), the MS 102 transmits to the BS 103 a reconnection request flag for terminating the idle mode and requesting network reconnection and RNG-REQ including the PCID of identifying the PC unit of the ASN-GW 106 associated with the MS 102 (Step S214).

Upon receiving the RNG-REQ, the BS 103 determines that the paging-target MS 102 exists thereunder, and transmits an idle mode exit request of requesting network reconnection to the PC unit of the ASN-GW 106 by terminating the idle mode by the MS 102 on the basis of the PCID of the RNG-REQ (Step S215).

Upon receiving the idle mode exit request, the PC unit of the ASN-GW 106 sends back to the BS 103 an idle mode exit response including registration information of the paging-target MS 102 in addition to key information for calculating CMAC that is used for authenticating RNG-REQ (Step S216).

Upon receiving the idle mode exit response, the BS 103 authenticates CMAC on the basis of the key information of the idle mode exit response to confirm the validity of RNG-REQ. When the validity is confirmed, the BS 103 transmits to the MS 102 RNG-RSP including optimization information such as communication-start connection information in addition to a location registration updating success (Step S217), and starts communication with the MS 102.

Furthermore, the ASN-GW 106 transmits paging public information including a stop code to all the BSs 103 in the same PG (Step S218). Upon receiving the paging public information including the stop code, the BS 103 stops the continuous transmission of the paging information.

However, because the femto BS 103B and the femto GW 109 are connected by a point to point encryption tunnel such as an IP security in the wireless communication system 100B including the femto BS 103B, paging information cannot be delivered in a multicasting manner, and thus it is required to suppress the number of deliveries of paging information to the minimum.

In other words, when the femto BSs 103B of which the number is, for example, 1000 exist thereunder, the femto GW 109 should copy paging information for the underneath MS 102 1000 times and transmit the paging information to all the femto BSs 103B. This leads to consume a large bandwidth on the Internet 101 in addition to the process burden.

FIG. 19 is an explanation diagram plainly illustrating a normal paging function associated with each the BS 103 in the same PG.

When the BSs 103 "#1", "#2", and "#3" are in the same PG in the case of a normal paging function illustrated in FIG. 19, there is illustrated an example in which the MS 102 "#3" is under the BS 103 "#1" and the MS 102 "#1" is under the BS 103 "#2", and the MS 102 "#2" moves by a route of the BS 103 "#1"->the BS 103 "#2"->the BS 103 "#3".

In this case, when packets of the MSs 102 "#1", "#2", and "#3" are generated, all the BSs 103 "#1", "#2", and "#3" in the same PG transmit the paging information of the MSs 102 "#1", "#2", and "#3".

However, in the case of the normal paging function, each the BS 103 in the same PG should deliver the paging information of the paging-target MS 102 regardless of the case where the MS 102 does not exist under the BS 103. For example, because the BS 103 "#2" transmits the paging information of the MS 102 "#3" in addition to the paging information of the MSs 102 "#1" and "#2" regardless of the case where the MSs 102 "#1" and "#2" exist and the MS 102 "#3" does not exist in the BS 103 "#2", the transmission of useless paging information occurs.

Therefore, a location based paging function for delivering the paging information of the paging-target MS 102 from only the BS 103 in which the MS 102 exists is considered in order to deal with such a situation.

FIG. 20 is an explanation diagram plainly illustrating a location based paging function associated with each the BS 103 in the same PG.

Assuming that the BS 103 and the MS 102 are arranged in the location based paging function illustrated in FIG. 20 similarly to the group configuration of the normal paging function illustrated in FIG. 19, each the BS 103 transmits the paging information of the MS 102 when the MS 102 exists under the BS 103 even in the case of the same PG. For example, when the MSs 102 "#1" and "#2" exist under the BS 103 "#2", the BS 103 "#2" transmits only the paging information of the MSs 102 "#1" and "#2". In this way, a data delivery amount of paging information can be reduced by preventing the delivery of useless paging information.

Non-Patent Document 1: IEEE Std 802.16 TM-2004
Non-Patent Document 2: IEEE Std 802.16e TM-2005
Non-Patent Document 3: IEEE 802.16m-08/579

DISCLOSURE OF INVENTION

Problem to be Solved by the Invention

In the conventional wireless communication system, when the macro BSs 103A and the femto BSs 103B are provided in the same PG and a packet for the MS 102 under the same PG is generated, because paging information heading to the MS 102 is transmitted through all the BSs 103 in the same PG, i.e., all the macro BSs 103A and all the femto BSs 103B, it is considered that a data delivery amount of paging information increases due to the transmission of useless paging information.

Moreover, because the MS 102 "#3" itself does not recognize that only the BS 103 "#1" transmits paging information for the MS 102 "#3" even if the BSs 103 are the same PG as illustrated in FIG. 20 in the wireless communication system that employs the location based paging function, the MS 102 "#3"cannot promptly perform a location registration request even if it moves to the other BS 103 "#3" in the same PG. The MS 102 "#3" performs the location registration request in accordance with the time-up of an idle mode timer. As a result, until location registration is completed, the MS 102 "#3" cannot receive paging information from the BS 103 "#3" regardless of the case where the MS 102 "#3" is under the BS 103 "#3", and thus a stable paging process cannot guaranteed.

Moreover, because a wireless range of the femto BS 103B is extremely narrower than that of the neighboring macro BS 103A in conventional wireless communication system, the number of the MSs 102 located in the wireless range of the femto BS 103B is extremely smaller than the number of the MSs 102 located in the wireless range of the neighboring macro BS 103A in many cases. In other words, most of paging information transmitted from the femto BS 103B is, with a high possibility, paging information for the MS 102 located in the wireless range of the neighboring macro BS 103A.

The present invention has been achieved in view of the above problems, and an object of the invention is to avoid the transmission of useless paging information to largely reduce a data delivery amount and realize stable paging control.

Means for Solving Problem

According to a first aspect, an apparatus used is a communication control apparatus for controlling communication of a plurality of base stations of which each wirelessly accommodates a mobile subscriber. The communication control apparatus includes a group setting unit that sets a normal group for normal base stations among the plurality of base stations and a specified group for specified base stations different from the normal base stations among the plurality of base stations; a location registration managing unit that manages, for each the mobile subscriber, group identification information of identifying a group of the base stations corresponding to a present position of the mobile subscriber and last base station identification information of identifying a base station that performs final location registration of the mobile subscriber; and a paging control unit that acquires, upon receiving data for the mobile subscriber, the group identification information corresponding to the mobile subscriber from the location registration managing unit and transmits paging information of the mobile subscriber through all the normal base stations of the normal group when the acquired group identification information is the normal group and that acquires, upon receiving data for the mobile subscriber, the group identification information corresponding to the mobile subscriber from the location registration managing unit, acquires the last base station identification information corresponding to the mobile subscriber from the location registration managing unit when the acquired group identification information is the specified group, and transmits paging information of the mobile subscriber through the specified base station of the acquired last base station identification information.

According to a second aspect, a method used is a communication control method for controlling communication of a plurality of base stations of which each wirelessly accommodates a mobile subscriber. The communication control method includes a group setting step of setting a normal group for normal base stations among the plurality of base stations and a specified group for specified base stations different from the normal base stations among the plurality of base stations; a location registration managing step of managing, for each the mobile subscriber in a location registration managing unit, group identification information of identifying a group of the base stations corresponding to a present position of the mobile subscriber and last base station identification information of identifying a base station that performs final location registration of the mobile subscriber; and a paging control step of acquiring, upon receiving data for the mobile subscriber, the group identification information corresponding to the mobile subscriber from the location registration managing unit and transmits paging information of the mobile subscriber through all the normal base stations of the normal group when the acquired group identification information is the normal group and that acquires, upon receiving data for the mobile subscriber, the group identification information corresponding to the mobile subscriber from the location registration managing unit, acquires the last base station identification information corresponding to the mobile subscriber from the location registration managing unit when the acquired group identification information is the specified group, and transmits paging information of the mobile subscriber through the specified base station of the acquired last base station identification information.

According to a third aspect, a program used is a communication control program for controlling communication of a plurality of base stations of which each wirelessly accommodates a mobile subscriber. The communication control program causes a computer to execute a group setting step of setting a normal group for normal base stations among the plurality of base stations and a specified group for specified base stations different from the normal base stations among the plurality of base stations; a location registration managing step of managing, for each the mobile subscriber in a location registration managing unit, group identification information of identifying a group of the base stations corresponding to a present position of the mobile subscriber and last base station identification information of identifying a base station that performs final location registration of the mobile subscriber; and a paging control step of acquiring, upon receiving data for the mobile subscriber, the group identification information corresponding to the mobile subscriber from the location registration managing unit and transmits paging information of the mobile subscriber through all the normal base stations of the normal group when the acquired group identification information is the normal group and that acquires, upon receiving data for the mobile subscriber, the group identification information corresponding to the mobile subscriber from the location registration managing unit, acquires the last base station identification information corresponding to the mobile subscriber from the location registration managing unit when the acquired group identification information is the specified group, and transmits paging information of the mobile subscriber through the specified base station of the acquired last base station identification information.

Effect of the Invention

Even if it is assumed that a normal base station is provided as a normal group and a specified base station is provided as a specified group to generate data for a mobile subscriber, stable paging control can be realized while avoiding the transmission of useless paging information through the normal base station and the specified base station to largely reduce a data delivery amount.

EXPLANATIONS OF LETTERS OR NUMERALS

1 Wireless communication system
1A Wireless communication system
1B Wireless communication system
2 MS
3 BS
3A Macro BS
3B Femto BS
4 ASN-GW
24 GW-side control unit
23A PGID management table
23B location registration database

BEST MODE(S) FOR CARRYING OUT THE INVENTION

Exemplary embodiments of a communication control apparatus, a communication control method, and a communication control program according to the present invention will be explained below in detail with reference to the accompanying drawings.

As a summary of the present embodiment, a wireless communication system includes a plurality of BSs of which each wirelessly accommodates MS and an ASN-GW that manages the plurality of BSs. The plurality of BSs includes macro BSs and femto BSs. A paging group (PG) is set for geographically adjacent macro BSs and PG different from that of neighboring macro BSs is set for femto BSs.

When MS is in the PG for the macro BS and the ASN-GW receives a packet for the MS, the ASN-GW transmits paging information of the MS to all macro BSs in the PG.

Moreover, when MS is in the PG for the femto BS and the ASN-GW receives a packet for the MS, the ASN-GW transmits paging information of the MS to a femto BS that performs the final location registration.

In the present embodiment, when a packet for MS is generated, delivering useless paging information for the MS to a macro BS and a femto BS as before is avoided so as to largely reduce a data delivery amount, and further stable paging control can be realized.

First Embodiment

Figure 1:
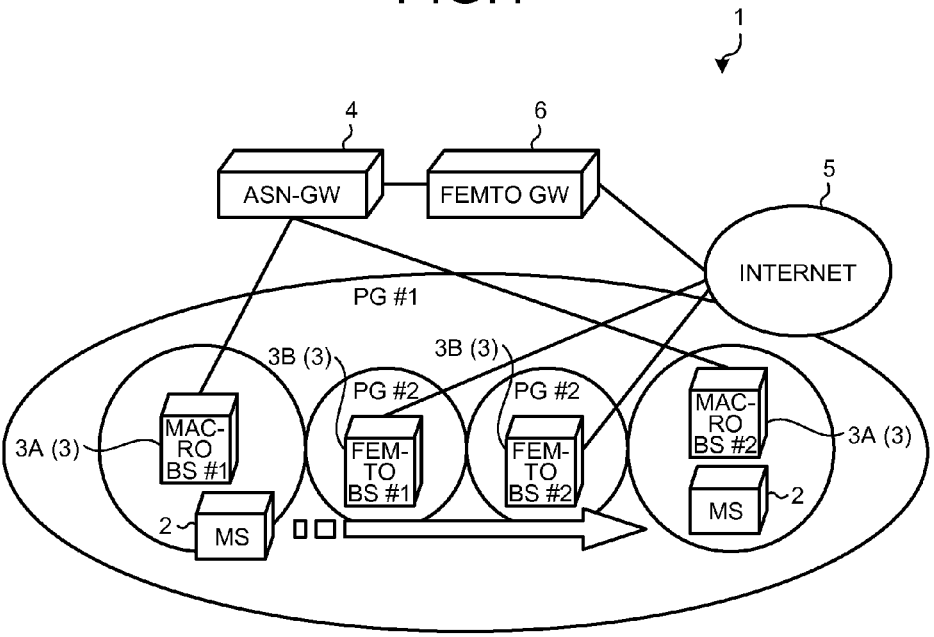
FIG. 1 is an explanation diagram illustrating the schematic configuration of a wireless communication system according to a first embodiment.

FIG. 1 is an explanation diagram illustrating the schematic configuration of a wireless communication system 1 according to the first embodiment.

The wireless communication system 1 illustrated in FIG. 1 includes a plurality of BSs 3 that wirelessly accommodates a plurality of MSs 2, an ASN-GW 4 that accommodates macro BSs 3A of the plurality of BSs 3, and a femto GW 6 that accommodates femto BSs 3B of the plurality of BSs 3 by way of Internet 5. The ASN-GW 4 accommodates the femto BSs 3B by way of the femto GW 6 and the Internet 5.

The wireless communication system 1 sets PG #1 in the plurality of macro BSs 3A that is geographically adjacent and sets PG #2 different from the PG of the macro BSs 3A in the plurality of femto BSs 3B that is not geographically adjacent. In other words, PG for the femto BSs 3B is the same common PG.

Moreover, the femto GW 6 uses an IP security between it and each the femto BS 3B to set a point to point encryption tunnel and prevents eavesdropping, data interpolation, and the like by way of the Internet 5.

Figure 2:
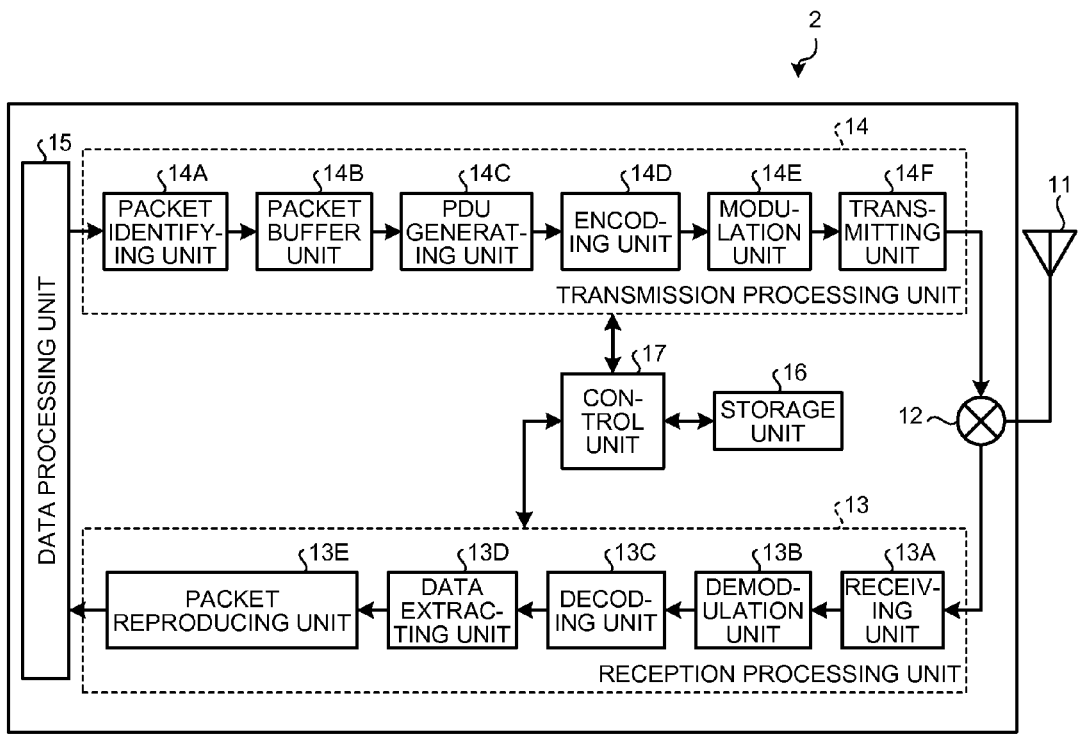
FIG. 2 is a block diagram illustrating the schematic configuration of MS.

FIG. 2 is a block diagram illustrating the schematic configuration of the MS 2.

The MS 2 illustrated in FIG. 2 includes an antenna 11 that transmits and receives a radio signal to and from the BS 3, a duplexer 12 that enables to share the antenna 11 in a transmission and reception system, a reception processing unit 13 that performs a reception process, a transmission processing unit 14 that performs a transmission process, a data processing unit 15, a storage unit 16 that stores therein various information, and a control unit 17 that controls the whole of the MS 2.

The reception processing unit 13 includes a receiving unit 13A that receives the radio signal received by the antenna 11, a demodulation unit 13B that demodulates the received signal, a decoding unit 13C that decodes the demodulated received signal, a data extracting unit 13D that extracts control data (for example, PAG-ADV) and packeted data from the decoded data, and a packet reproducing unit 13E that reproduces the data extracted by the data extracting unit 13D.

The data processing unit 15 performs a display process, a voice output process, and the like on various types of data included in the received data.

The transmission processing unit 14 includes a packet identifying unit 14A that identifies an IP address included in the packet data received from the data processing unit 15 and specifies a connection on the basis of the IP address, a packet buffer unit 14B that stores the packet data received from the data processing unit 15, a protocol data unit (PDU) generating unit 14C that stores transmission data of user data and control data in a radio frame, an encoding unit 14D that encodes the transmission data, a modulation unit 14E that modulates the encoded transmission data, and a transmitting unit 14F that transmits the modulated transmission data.

The packet identifying unit 14A identifies an IP address included in the packet data received from the data processing unit 15 and specifies a connection on the basis of the IP address (for example, stores a correspondence between the IP address and an ID for the connection and acquires the ID for the corresponding connection). At the same time, the packet identifying unit 14A acquires QOS (similarly, is stored in association with ID) information corresponding to the ID, gives the ID, the QOS information, and the data size to the control unit 17 to request transmission, and stores the packet data handed from the data processing unit 15 in the packet buffer unit 14B.

Upon receiving the transmission request from the packet identifying unit 14A, the control unit 17 requests a bandwidth to the BS 3. When a bandwidth is assigned, the control unit 17 instructs the packet buffer unit 14B and the PDU generating unit 14C to perform the transmission. Moreover, the control unit 17 generates control data (for example, RNG-REQ and a bandwidth request header) and transmits the control data to the BS 3.

The PDU generating unit 14C generates PDU in such a manner that the transmission data of user data and control data is stored in a radio frame formed by using a synchronizing signal (preamble) transmitted by the BS 3 as a standard, and transmits the PDU to the encoding unit 14D. In this case, when the user data is encrypted, an encryption processing unit of the PDU generating unit 14C encrypts the user data by using an encryption key, a radio frame number, and an index reported from the control unit 17.

The encoding unit 14D, the modulation unit 14E, and the transmitting unit 14F sequentially perform an encoding process such as error correcting coding on the PDU data, modulate the encoded data, and transmit the modulated data as a radio signal via the antenna 11.

Moreover, the control unit 17 processes control data that is transmitted and received to and from the BS 3. For example, the control unit 17 extracts and manages the radio frame number, BSID, and PGID from the received control data, and further performs registration of the support function of the MS 2, authentication, key generation and exchange, state management of a radio channel, management of a communication state of the MS 2, and the like. For example, the control unit 17 moves to an idle mode to plan the reduction of power consumption when communication is not performed for a while.

Moreover, the control unit 17 performs a location registration request during an idle mode in accordance with the PGID and BSID received from the BS 3.

Moreover, the control unit 17 manages an idle mode timer and performs a location registration request in accordance with the time-up of the idle mode timer.

Moreover, the control unit 17 controls the transmission processing unit 14 on the basis of the assignment information of a bandwidth of an uplink received from the BS 3, and transmits user data or control data to the BS 3.

Moreover, when the assignment of a bandwidth is required, the control unit 17 instructs the transmission processing unit 14 to transmit a BR header of a connection that requires bandwidth assignment to the BS 3.

Figure 3:
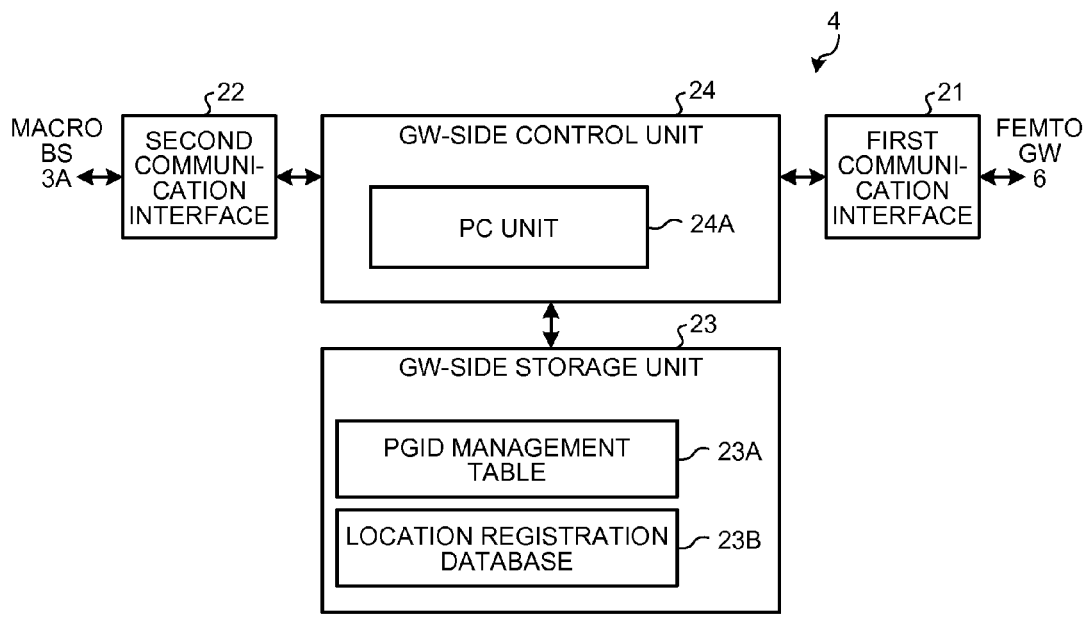
FIG. 3 is a block diagram illustrating the schematic configuration of ASN-GW.

FIG. 3 is a block diagram illustrating the schematic configuration of the ASN-GW 4.

The ASN-GW 4 illustrated in FIG. 3 includes a first communication interface 21 that takes charge of an interface with the femto BS 3B by way of the femto GW 6 and a second communication interface 22 that takes charge of an interface with an internal device such as the macro BS 3A in the ASN.

The ASN-GW 4 further includes a GW-side storage unit 23 that stores various information and a GW-side control unit 24 that controls the whole of the ASN-GW 4.

The GW-side control unit 24 includes a paging controller (hereinafter, "PC") unit 24A that performs paging control on each the MS 2.

The PC unit 24A performs a location registration updating process for updating and registering the position information of each the MS 2 and also performs a paging process on each the MS 2.

The GW-side storage unit 23 includes a PGID management table 23A that manages PGID belonging to each the BS 3 such as the macro BS 3A and the femto BS 3B and a location registration database 23B that registers position information for each the MS 2 located in the BS 3.

Moreover, the PC unit 24A of the GW-side control unit 24 performs the location registration updating process and the paging process on the basis of the position information of the MS 2 registered in the location registration database 23B.

Moreover, the GW-side control unit 24 communicates with an AAA server in order to perform the authentication for the MS 2, provides a data transfer path between the macro BS 3A and the femto BS 3B, and provides a PC function for the MS 2.

Figure 4:
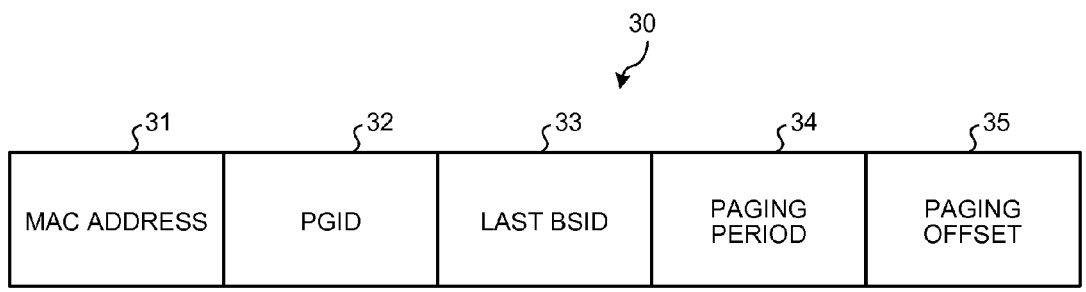
FIG. 4 is an explanation diagram plainly illustrating a data structure of information that is managed in a location registration database of the ASN-GW.

FIG. 4 is an explanation diagram plainly illustrating the data structure of information that is managed in the location registration database 23B of the ASN-GW 4.

The location registration database 23B manages position information 30 of the MS 2 that is managed in the ASN-GW 4.

The position information 30 includes an MAC address 31 for identifying the MS 2, an PGID 32 for identifying PG to which the BS 3 in which the MS 2 is located belongs, a last BSID 33 for identifying the BS 3 (the macro BS 3A or the femto BS 3B) that performs the final location registration of the MS 2, a paging period 34 for transmitting paging information (PAG-ADV) for the MS 2 during an idle mode, and a paging offset 35 for managing an offset of a timing of a paging period.

For example, when the MS 2 moves from the macro BS 3A to the femto BS 3B, the MS 2 determines that its PG is changed in accordance with the movement and performs a location registration request. In this case, the PC unit 24A of the ASN-GW 4 updates and registers, in the location registration database 23B, the PGID 32 indicating that the MS 2 is under the PG #2 and the last BSID 33 for identifying the femto BS 3B that performs the final location registration.

The ASN-GW 4 receives the packet for the MS 2. When the paging-target MS 2 is under the PG that is common to the femto BSs 3B, the ASN-GW 4 transmits paging information to only the femto BS 3B on the basis of the last BSID 33 registered in the location registration database 23B. As a result, it is not necessary to transmit paging information to all the femto BSs 3B under the same PG #2 common to the femto BSs 3B.

Although PG is not changed when the MS 2 moves between the femto BSs 3B under the same PG #2, the MS 2 detects the change of BSID in accordance with the public information of BSID output from the femto BS 3B that is its move destination, determines that the movement between the femto BSs 3B under the same PG #2 is detected, performs the location registration updating process, and updates and registers the last BSID 33 associated with the MS 2 stored in the ASN-GW 4 in the location registration database 23B.

Figure 5:
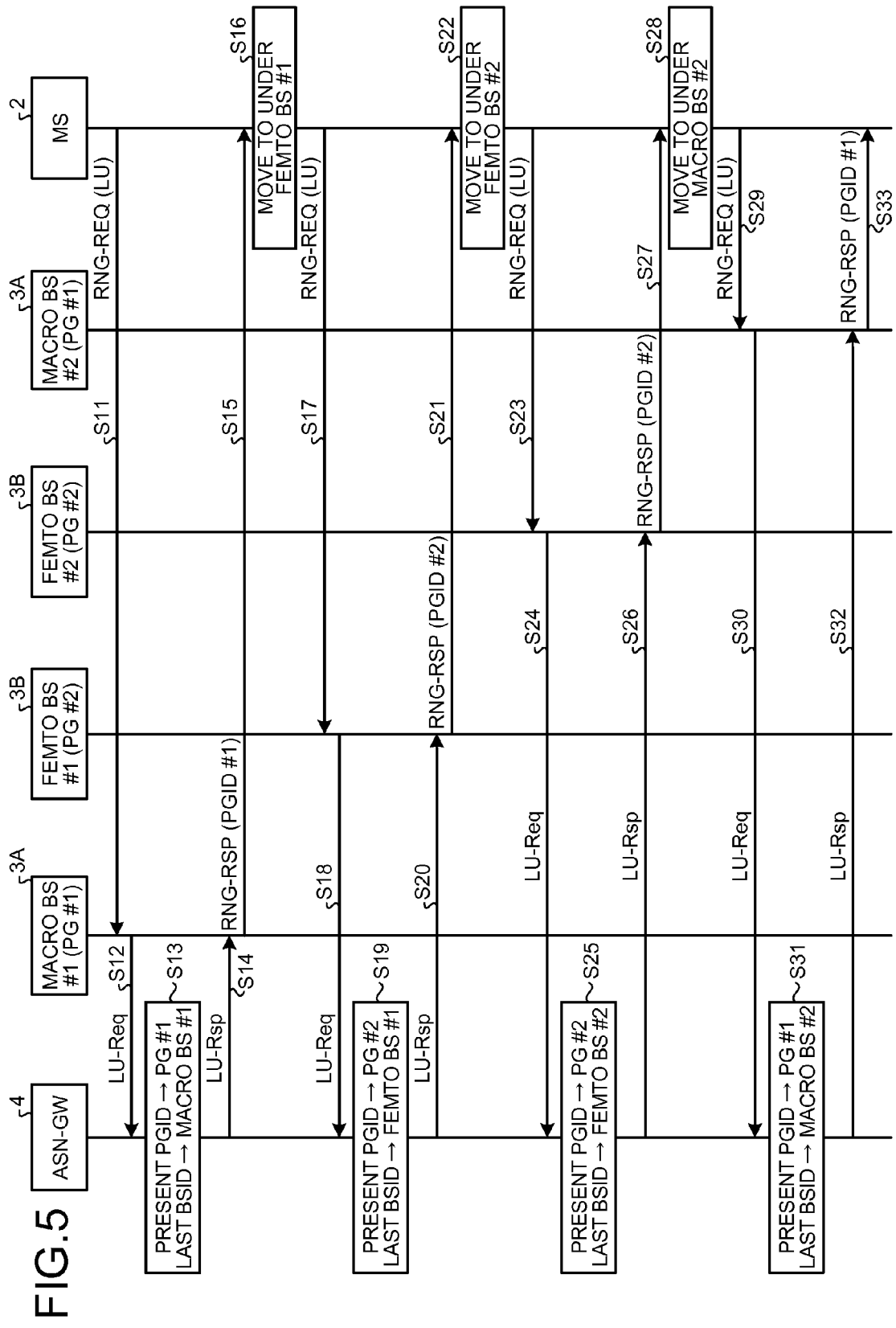
FIG. 5 is an operating sequence diagram plainly illustrating processing operations of the wireless communication system associated with a location registration updating process.

Next, it will be explained about operations of the wireless communication system 1 according to the first embodiment. FIG. 5 is an operating sequence diagram plainly illustrating processing operations of the wireless communication system associated with the location registration updating process.

The location registration updating process illustrated in FIG. 5 is a process for updating and registering the position information of the MS 2 in the location registration database 23B of the ASN-GW 4 when the MS 2 during an idle mode moves, for example, from the macro BS 3A "#1" to the macro BS 3A "#2" by way of the femto BS 3B "#1" and the femto BS 3B "#2" as illustrated in FIG. 1.

The MS 2 during an idle mode is under the macro BS 3A "#1" and transmits RNG-REQ including an LU request flag to the macro BS 3A "#1" in order to request location registration updating (Step S11). Moreover, RNG-REQ is a message that includes the LU request flag of requesting the location registration updating process and the PCID of identifying the PC unit 24A of the ASN-GW 4 associated with the MS 2.

Upon receiving the RNG-REQ from the MS 2, the macro BS 3A "#1" transmits LU-Req to the ASN-GW 4 that includes the PC unit 24A associated with the PCID of the RNG-REQ (Step S12).

Upon receiving the LU-Req, the ASN-GW 4 updates the present PGID 32 of identifying the present PG registered in the location registration database 23B and the last BSID 33 of identifying the BS 3 that performs the final location registration (Step S13). In other words, the ASN-GW 4 updates the present PGID 32 to the PG #1 of the macro BS 3A "#1" and the last BSID 33 to the macro BS 3A "#1" and registers the results in the location registration database 23B. Moreover, the macro BS 3A "#1" may inform the ASN-GW 4 of its own PGID of the LU-Req.

In this case, when the packet for the MS 2 is received, the ASN-GW 4 instructs all the macro BSs 3A under the PG #1 to transmit the paging information of the same MS 2.

Moreover, upon detecting the location registration updating of the MS 2, the ASN-GW 4 informs the macro BS 3A "#1" of the LU-Rsp including the PGID of the PG #1 in which the MS 2 exists (Step S14).

Upon receiving the LU-Rsp, the macro BS 3A "#1" informs the MS 2 of RNG-RSP including the PGID of the PG #1 in which the MS 2 exists (Step S15).

As a result, as far as the MS 2 is under the macro BS 3A in the PG #1, it is not necessary to perform the location registration updating process caused by the change of PG. However, the MS 2 naturally performs the location registration updating process in accordance with the time-up of the idle mode timer.

Next, when the MS 2 moves from the macro BS 3A "#1" to the femto BS 3B "#1" (Step S16), the MS 2 receives the PGID of the PG #2 informed by the femto BS 3B "#1" to determine that itself leaves the BS 3 under the PGID (the PG #1) in which itself exists until now and transmits the RNG-REQ including the LU request flag to the femto BS 3B "#1" to request the location registration updating (Step S17).

Upon receiving the RNG-REQ from the MS 2, the femto BS 3B "#1" transmits the LU-Req to the ASN-GW 4 that includes the PC unit 24A associated with the PCID of the RNG-REQ (Step S18). In this case, the femto BS 3B "#1" transmits the LU-Req to the ASN-GW 4 by way of the Internet 5 and the femto GW 6.

Upon receiving the LU-Req, the ASN-GW 4 updates the present PGID 32 of identifying the present PG registered in the location registration database 23B and the last BSID 33 of identifying the BS 3 that performs the final location registration (Step S19). In other words, the ASN-GW 4 updates the present PGID 32 to the PG #2 of the femto BS 3B "#1" common to the femto BSs 3B and the last BSID 33 to the femto BS 3B "#1"and registers the results in the location registration database 23B.

In this case, when the packet for the MS 2 is received, the ASN-GW 4 instructs only the femto BS 3B "#1" of the last BSID 33 under the PG #2 to transmit the paging information of the MS 2.

Moreover, upon detecting the location registration updating of the MS 2, the ASN-GW 4 informs the femto BS 3B "#1"of the LU-Rsp including the PGID of the PG #2 in which the MS 2 exists (Step S20).

Upon receiving the LU-Rsp, the femto BS 3B "#1"informs the MS 2 of RNG-RSP including the PGID of the PG #2 in which the MS 2 exists (Step S21).

As a result, as far as the MS 2 is under the femto BS 3B "#1" in the PG #2, it is not necessary to perform the location registration updating process caused by the change of PG. However, the MS 2 naturally performs the location registration updating process in accordance with the time-up of an idle mode timer.

Next, upon receiving the PGID of the PG #2 informed by the femto BS 3B "#2" when the MS 2 moves from the femto BS 3B "#1" to the femto BS 3B "#2" in the same PG #2 (Step S22), the MS 2 determines that itself is under the PG #2 common to the femto BSs 3B and thus the femto BS 3B is changed and transmits the RNG-REQ including the LU request flag to the femto BS 3B "#2" to request the location registration updating (Step S23).

Upon receiving the RNG-REQ from the MS 2, the femto BS 3B "#2" transmits LU-Req to the ASN-GW 4 that includes the PC unit 24A associated with the PCID of the RNG-REQ (Step S24). In this case, the femto BS 3B "#2" informs the ASN-GW 4 of the LU-Req by way of the Internet 5 and the femto GW 6.

Upon receiving the LU-Req, the ASN-GW 4 updates the present PGID 32 of identifying the present PG registered in the location registration database 23B and the last BSID 33 of identifying the BS 3 that performs the final location registration (Step S25). In other words, the ASN-GW 4 updates the present PGID 32 to the PG #2 common to the femto BSs 3B and the last BSID 33 to the femto BS 3B "#2" and registers the results in the location registration database 23B.

In this case, when the packet for the MS 2 is received, the ASN-GW 4 instructs only the femto BS 3B "#2" of the last BSID 33 under the PG #2 to transmit the paging information of the MS 2.

Moreover, upon detecting the location registration updating of the MS 2, the ASN-GW 4 informs the femto BS 3B "#2"of LU-Rsp including the PGID of the PG #2 in which the MS 2 exists (Step S26).

Upon receiving the LU-Rsp, the femto BS 3B "#2"informs the MS 2 of RNG-RSP including the PGID of the PG #2 in which the MS 2 exists (Step S27).

As a result, as far as the MS 2 is under the femto BS 3B "#2" in the PG #2, it is not necessary to perform the location registration updating process caused by the change of PG. However, the MS 2 naturally performs the location registration updating process in accordance with the time-up of the idle mode timer.

Next, when the MS 2 moves from the femto BS 3B "#2" to the macro BS 3A "#2" (Step S28), the MS 2 receives the PGID of the PG #1 informed by the macro BS 3A "#2" to determine that itself leaves the femto BS 3B "#2" under the PGID (the PG #2) in which itself exists until now and transmits the RNG-REQ including the LU request flag to the macro BS 3A "#2" to request the location registration updating (Step S29).

Upon receiving the RNG-REQ from the MS 2, the macro BS 3A "#2" transmits LU-Req to the ASN-GW 4 that includes the PC unit 24A associated with the PCID of the RNG-REQ (Step S30).

Upon receiving the LU-Req, the ASN-GW 4 updates the present PGID 32 of identifying the present PG registered in the location registration database 23B and the last BSID 33 of identifying the BS 3 that performs the final location registration (Step S31). In other words, the ASN-GW 4 updates the present PGID 32 to the PG #1 of the macro BS 3A "#2" and the last BSID 33 to the macro BS 3A "#2" and registers the results in the location registration database 23B.

In this case, when the packet for the MS 2 is received, the ASN-GW 4 instructs all the macro BSs 3A in the PG #1 to transmit the paging information of the MS 2.

Moreover, upon detecting the location registration updating of the MS 2, the ASN-GW 4 informs the macro BS 3A "#2"of the LU-Rsp including the PGID of the PG #1 in which the MS 2 exists (Step S32).

Upon receiving the LU-Rsp, the macro BS 3A "#2"informs the MS 2 of the RNG-RSP including the PGID of the PG #1 in which the MS 2 exists (Step S33).

As a result, as far as the MS 2 is under the macro BS 3A in the PG #1, it is not necessary to perform the location registration updating process caused by the change of PG. However, the MS 2 naturally performs the location registration updating process in accordance with the time-up of the idle mode timer.

Figure 6:
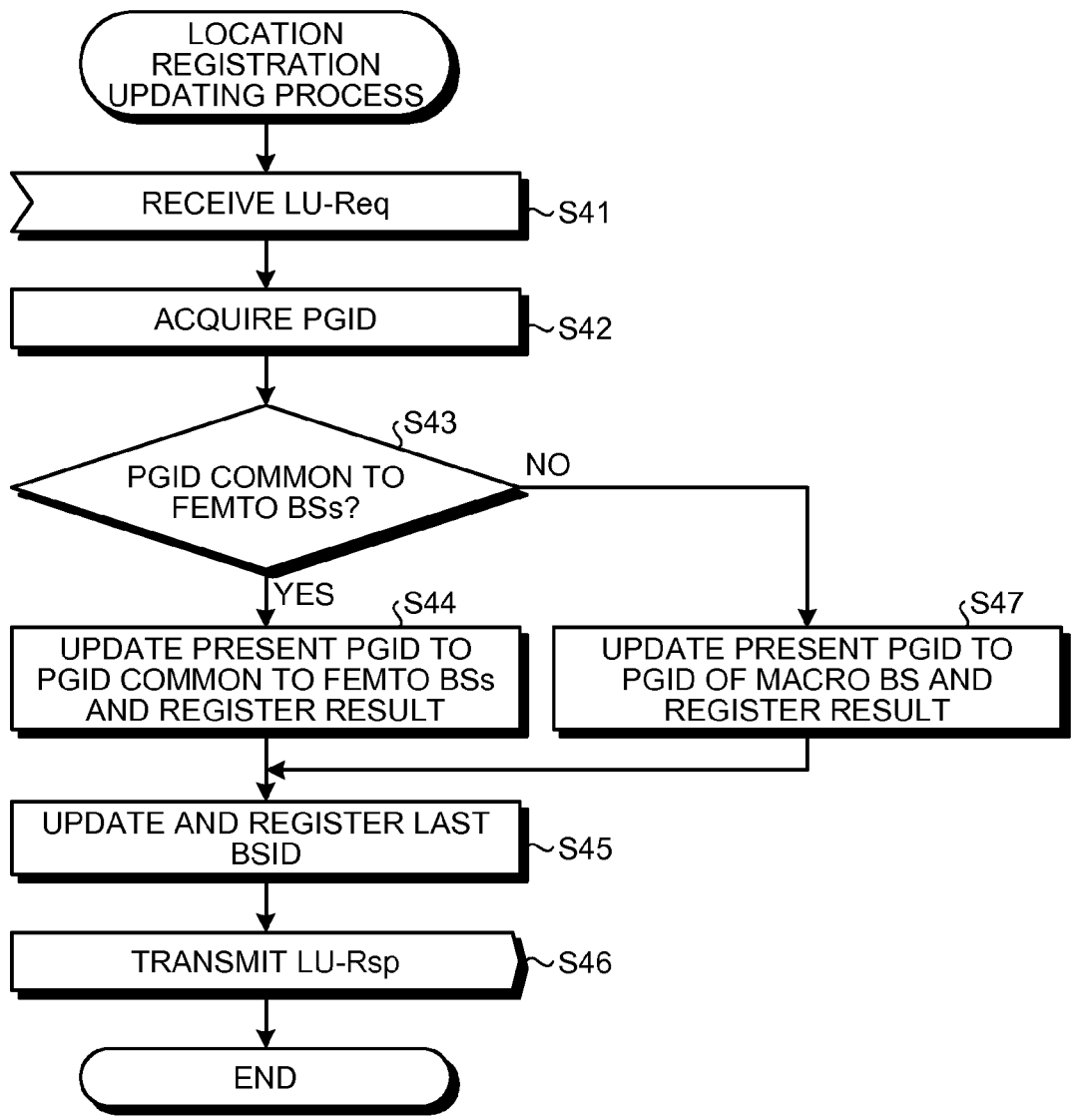
FIG. 6 is a flowchart illustrating processing operations of the ASN-GW associated with the location registration updating process.

Next, it will be explained about operations of the ASN-GW 4 associated with the location registration updating process. FIG. 6 is a flowchart illustrating processing operations of the ASN-GW 4 associated with the location registration updating process.

Upon receiving the LU-Req from the BS 3 (Step S41), the ASN-GW 4 illustrated in FIG. 6 acquires the PGID of the BS 3 that transmits the LU-Req (Step S42).

The ASN-GW 4 determines whether the PGID acquired at Step S42 is the PGID "#2" common to the femto BSs 3B (Step S43). Moreover, the determination whether the PGID is PGID common to the femto BSs 3B is performed by retrieving the PGID management table 23A that stores a correspondence relationship between the BS 3 and PGID or by storing PGID in LU-Req by the BS 3.

When the PGID acquired at Step S42 is the PGID "#2"common to the femto BSs 3B (Step S43: YES), the ASN-GW 4 updates the present PGID 32 to the PGID "#2" common to the femto BSs 3B and registers the result in the location registration database 23B in association with the MS 2 associated with the LU-Req (Step S44), and updates the last BSID 33 and registers the result in the location registration database 23B in association with the MS 2 (Step S45). Moreover, the last BSID 33 corresponds to the BSID of the BS 3 that generates the LU-Req.

When the last BSID 33 is updated, the ASN-GW 4 also updates parameters (paging period and paging offset) of an idle mode of the MS 2 and registers the results in the location registration database 23B and then sends back the LU-Rsp including information such as PGID and idle mode parameters to the BS 3 (Step S46). After that, the processing operations illustrated in FIG. 6 are terminated.

When the PGID acquired at Step S42 is not the PGID "#2" common to the femto BSs 3B (Step S43: NO), the ASN-GW 4 updates the present PGID 32 to the PGID of the macro BS 3A and registers the result in the location registration database 23B in association with the MS 2 associated with the LU-Req (Step S47), and moves the process control to Step S45 to update and register the last BSID 33 in the location registration database 23B.

Figure 7:
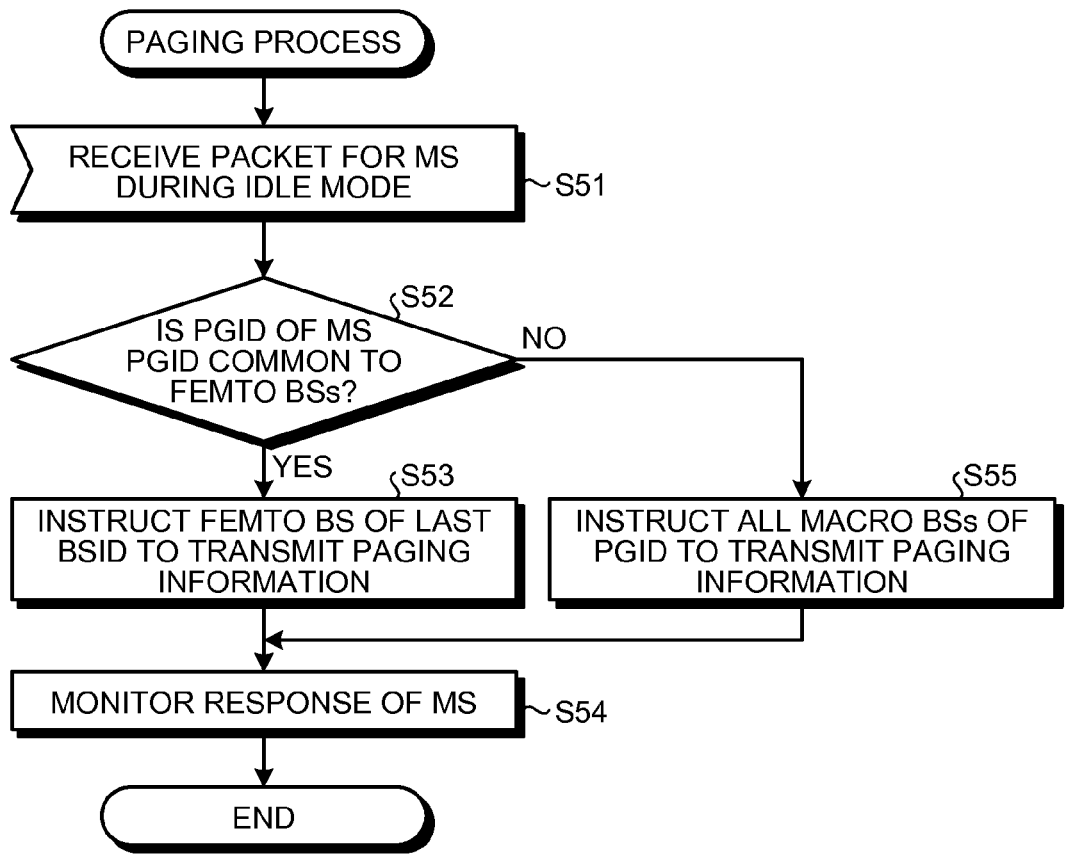
FIG. 7 is a flowchart illustrating processing operations of the ASN-GW associated with a paging process.

Next, it will be explained about operations of the ASN-GW 4 associated with a paging process. FIG. 7 is a flowchart illustrating processing operations of the ASN-GW 4 associated with a paging process.

Upon receiving the packet for the MS 2 during an idle mode (Step S51), the ASN-GW 4 illustrated in FIG. 7 retrieves the PGID 32 in which the MS 2 exists from the location registration database 23B and determines whether the PGID of the MS 2 is the PGID "#2" common to the femto BSs 3B (Step S52).

When the PGID of the MS 2 is the PGID "#2" common to the femto BSs 3B (Step S52: YES), the ASN-GW 4 instructs the femto BS 3B of the last BSID 33 registered in the location registration database 23B to transmit paging information (Step S53), monitors a response of the MS 2 for the paging information (Step S54), and terminates the processing operations illustrated in FIG. 7.

On the other hand, when the PGID of the MS 2 is not the PGID "#2" common to the femto BSs 3B (Step S52: NO), the ASN-GW 4 instructs all the macro BSs 3A of the PGID stored in the location registration database 23B to transmit paging information (Step S55) and moves the process control to Step S54 in order to monitor a response of the MS 2 for the paging information.

Figure 8:
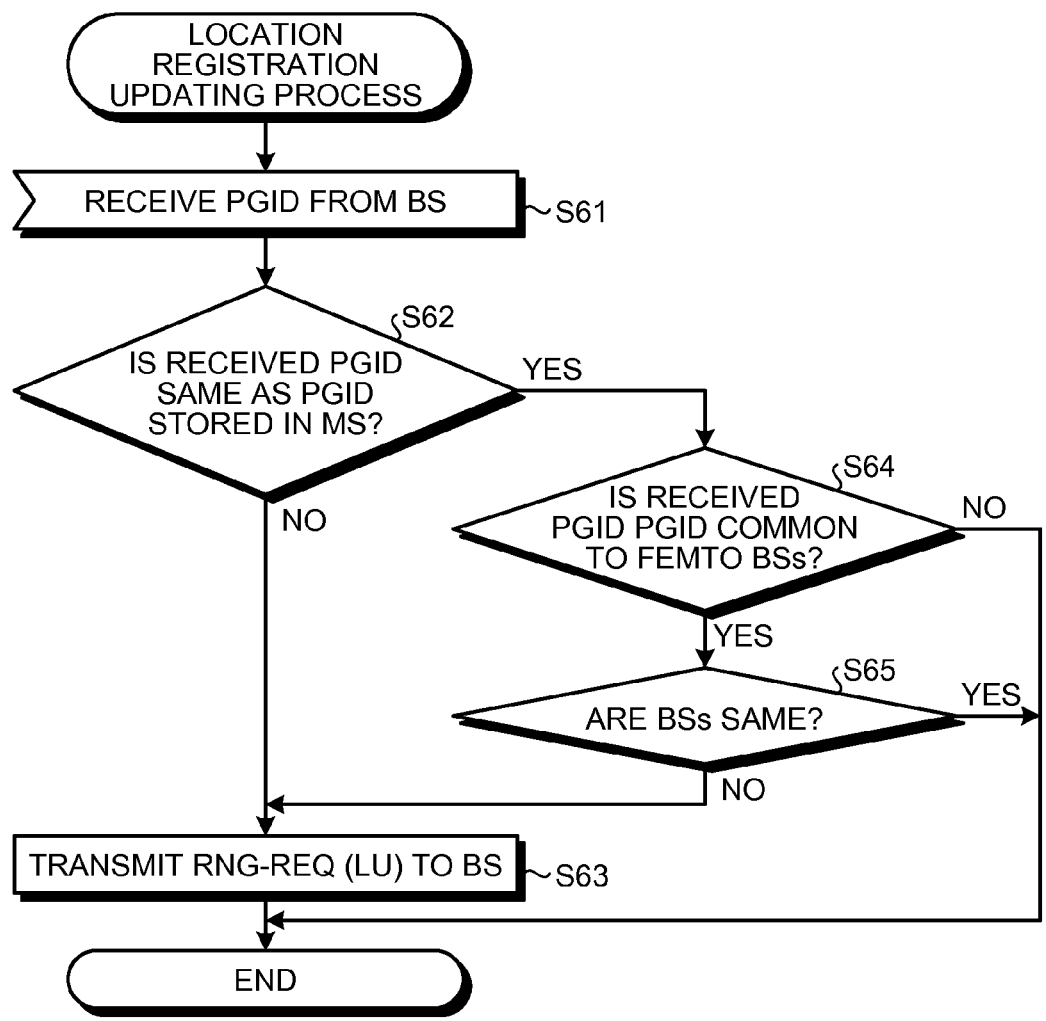
FIG. 8 is a flowchart illustrating processing operations of the MS associated with the location registration updating process.

Next, it will be explained about operations of the MS 2 associated with a location registration updating process. FIG. 8 is a flowchart illustrating processing operations of the MS 2 associated with a location registration updating process.

The MS 2 during an idle mode illustrated in FIG. 8 periodically receives PGID from the BS 3 (Step S61). In this case, PGID is included in a downlink channel descriptor that indicates paging information (PAG-ADV), configuration information of the BS 3, and the like.

The MS 2 determines whether the received PGID and the PGID stored in the MS 2 are the same as each other (Step S62).

When the received PGID is not the same as the PGID stored in the MS 2 (Step S62: NO), the MS 2 transmits RNG-REQ to the BS 3 to perform the location registration updating operation (Step S63) and terminates the processing operations illustrated in FIG. 8.

On the other hand, when the received PGID is the same as the PGID stored in the MS 2 (Step S62: YES), the MS 2 determines whether the received PGID is PGID common to the femto BSs 3B (Step S64).

When the received PGID is PGID common to the femto BSs 3B (Step S64: YES), the MS 2 determines whether the BS 3 that transmits the received PGID is the same as the BS 3 that transmits the PGID stored in the MS 2 (Step S65). In this case, the identification of the BSs 3 is performed by using a pattern of a preamble in the first packet of packets and BSID included in a message informed by the BS 3.

When the BS 3 that transmits the received PGID is not the same as the BS 3 that transmits the PGID stored in the MS 2 (Step S65: NO), the MS 2 transmits the RNG-REQ to the BS 3 and moves the process control to Step S63 in order to perform the location registration updating operation.

Moreover, when the received PGID is different from the PGID common to the femto BSs 3B (Step S64: NO) or when the BS 3 that transmits the received PGID is the same as the BS 3 that transmits the PGID stored in the MS 2 (Step S65: YES), the MS 2 terminates the processing operations illustrated in FIG. 8.

According to the first embodiment, among the plurality of BSs 3, the geographically adjacent macro BSs 3A are set in the PG #1, the femto BSs 3B are set in the PG #2 common to the femto BSs 3B, and the PGID 32 of identifying the PG of the BS 3 in which the MS 2 is currently located and the last BSID 33 of the BS 3 that performs the final location registration of the MS 2 are registered in the location registration database 23B when the location registration request of the MS 2 is detected in PG. Therefore, the management burdens of PGs to be set for the femto BSs 3B can be largely reduced by attempting large reduction of the number of PGs that are set for the femto BSs 3B. Moreover, because the number of bits indicating PG can be reduced by attempting large reduction of the number of PGs to be set for the femto BSs 3B, the management burdens of PGs can be reduced.

Moreover, according to the first embodiment, the PGID 32 corresponding to the present position of the MS 2 is acquired from the location registration database 23B when a packet for the MS 2 is received and the paging information of the MS 2 is transmitted to all the BSs 3 (the macro BSs 3A) under the PG #1 when the present PGID of the MS 2 is the PG #1. Therefore, a data delivery amount required for transmitting paging information can be largely reduced compared with the case where the macro BSs 3A and the femto BSs 3B are set in the same PG.

Moreover, according to the first embodiment, the PGID 32 corresponding to the present position of the MS 2 is acquired from the location registration database 23B when a packet for the MS 2 is received, the last BSID 33 of the MS 2 is acquired from the location registration database 23B when the acquired present PGID of the MS 2 is the PG #2, and the paging information of the MS 2 is transmitted to only the femto BS 3B of the acquired last BSID 33. Therefore, a data delivery amount required for transmitting paging information can be largely reduced and at the same time stable paging control can be realized, compared with the case where the macro BSs 3A and the femto BSs 3B are set in the same PG. Moreover, because the paging information of the MS 2 does not have to be delivered to all the femto BSs 3B under the PG #2, the transmission of useless paging information can be avoided and a bandwidth waste caused by the transmission of paging information on the Internet 5 performed by the femto BS 3B can be avoided.

According to the first embodiment, it has been explained about the case where the plurality of geographically adjacent macro BSs 3A is set in the PG #1 and the plurality of femto BSs 3B are set in the PG #2 common to the femto BSs 3B that are different from the neighboring macro BSs 3A. However, for example, the femto BSs 3B may be respectively set in PGs that are different from that of the neighboring macro BSs 3A, instead of the PG #2 common to the femto BSs 3B. Also in this case, a data delivery amount required for transmitting paging information can be large reduced and also stable paging control can be realized, compared with the case where the macro BSs 3A and the femto BSs 3B are set in the same PG.

Moreover, according to the first embodiment, it has been explained about the case where the plurality of geographically adjacent macro BSs 3A is set in the PG #1 and the plurality of femto BSs 3B are set in the PG #2 common to the femto BSs 3B that are different from that of the neighboring macro BSs 3A. However, a coverage area of the femto BS 3B is extremely narrower than that of the macro BS 3A when the femto BS 3B is set in PG different from that of the neighboring macro BSs 3A, and further location registration updating frequently occurs in accordance with the change of PG whenever the MS 2 passes the femto BS 3B even if a passage time of the femto BS 3B is a little bit when the MS 2 passes the macro BS 3A->the femto BS 3B->the macro BS 3A. As a result, it is considered that processing burdens required for location registration updating of the wireless communication system 1 become large.

Second Embodiment

Figure 9:
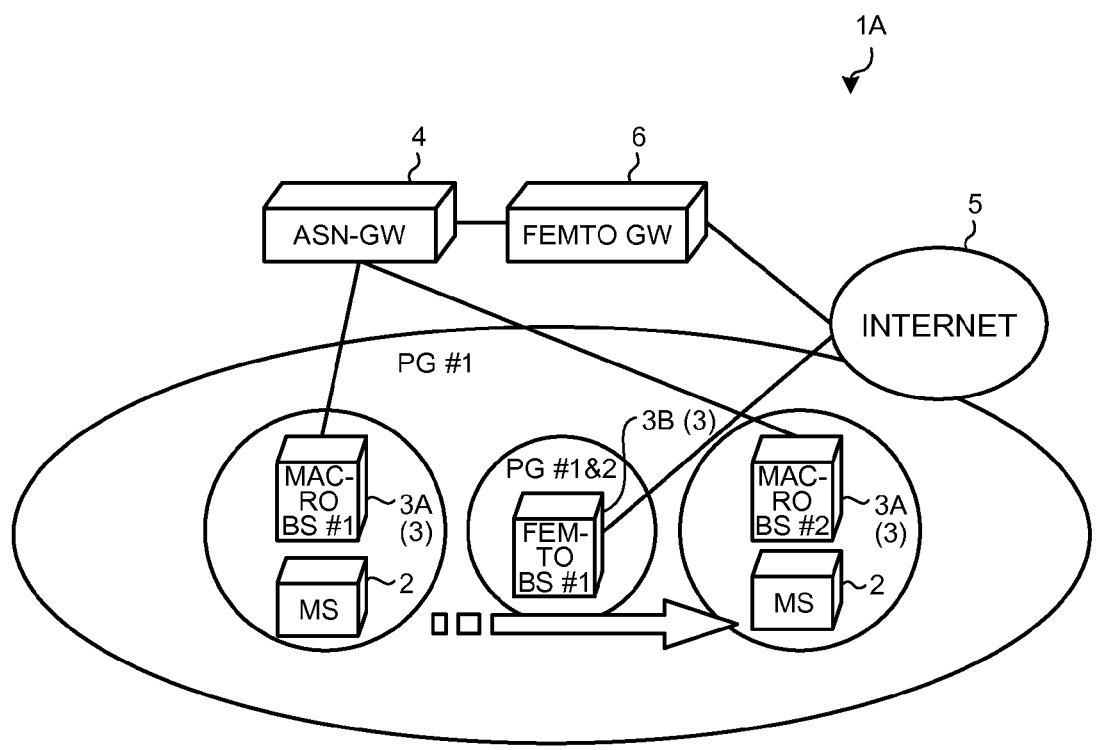
FIG. 9 is an explanation diagram illustrating the schematic configuration of a wireless communication system according to a second embodiment.

Now, a wireless communication system that deals with the above situation will be explained as the second embodiment. FIG. 9 is an explanation diagram illustrating the schematic configuration of a wireless communication system 1A according to the second embodiment. The same configuration as that of the wireless communication system 1 of the first embodiment illustrated in FIG. 1 has the same reference number, and the explanations of the same configuration and operation are omitted.

In the wireless communication system 1A illustrated in FIG. 9, the PG #1 is set for the plurality of geographically adjacent macro BSs 3A, and the PG #2 common to the femto BSs 3B and the same PG as that of the neighboring macro BSs 3A are set for the plurality of femto BSs 3B.

In other words, for example, two PGs of the PG #2 common to the femto BSs 3B and the PG #1 of the neighboring macro BSs 3A "#1" and "#2" are set for the femto BS 3B "#1".

Figure 10:
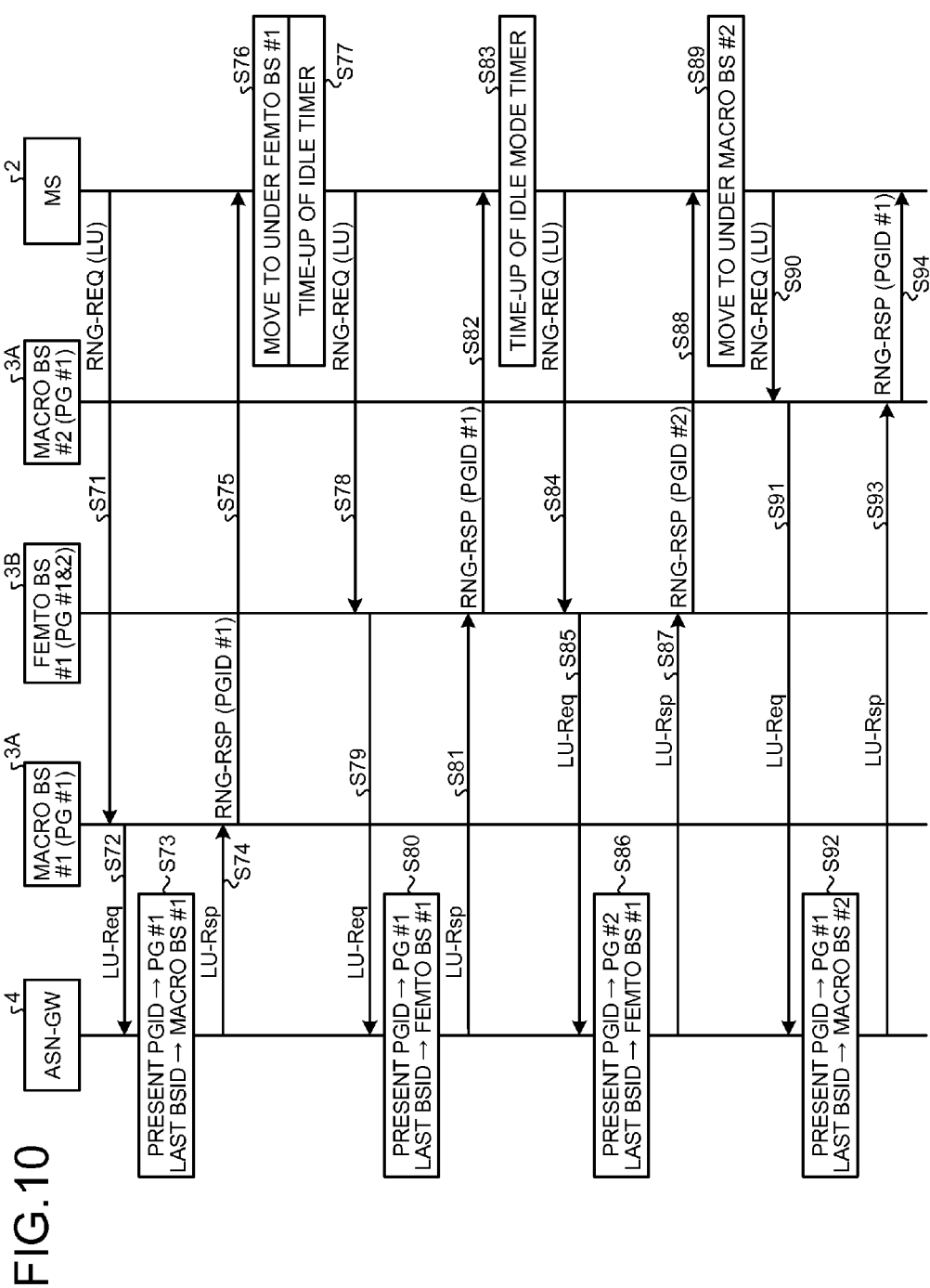
FIG. 10 is an operating sequence diagram illustrating processing operations of the wireless communication system associated with a location registration updating process.

Next, it will be explained about operations of the wireless communication system 1A according to the second embodiment. FIG. 10 is an operating sequence diagram illustrating processing operations of the wireless communication system 1A associated with a location registration updating process.

The location registration updating process illustrated in FIG. 10 is a process for updating and registering the position information of the MS 2 in the location registration database 23B of the ASN-GW 4 when the MS 2 during an idle mode moves, for example, from the macro BS 3A "#1" to the macro BS 3A "#2" by way of the femto BS 3B "#1" as illustrated in FIG. 9.

The MS 2 during an idle mode is under the macro BS 3A "#1" and transmits RNG-REQ including an LU request flag to the macro BS 3A "#1" to request location registration updating (Step S71). In this case, RNG-REQ is a message that includes the LU request flag of requesting the location registration updating process and the PCID of identifying the PC unit 24A of the ASN-GW 4 associated with the MS 2.

Upon receiving the RNG-REQ from the MS 2, the macro BS 3A "#1" transmits LU-Req to the ASN-GW 4 that includes the PC unit 24A associated with the PCID of the RNG-REQ (Step S72).

Upon receiving the LU-Req, the ASN-GW 4 updates the present PGID 32 of identifying the present PG registered in the location registration database 23B and the last BSID 33 of identifying the BS 3 that performs the final location registration (Step S73). In other words, the ASN-GW 4 updates the present PGID 32 to the PG #1 of the macro BS 3A "#1" and the last BSID 33 to the macro BS 3A "#1" and registers the results in the location registration database 23B.

The ASN-GW 4 instructs the macro BSs 3A and the femto BS 3B under the PG #1 to transmit the paging information of the MS 2 when the packet for the MS 2 is received.

Upon detecting the location registration updating of the MS 2, the ASN-GW 4 informs the macro BS 3A "#1" of LU-Rsp including the PGID of the PG #1 in which the MS 2 exists (Step S74).

Upon receiving the LU-Rsp, the macro BS 3A "#1"informs the MS 2 of RNG-RSP including the PGID of the PG #1 in which the MS 2 exists (Step S75).

As a result, as far as the MS 2 is under the macro BS 3A in the PG #1, it is not necessary to perform the location registration updating process caused by the change of PG. However, the MS 2 naturally performs the location registration updating process in accordance with the time-up of an idle mode timer.

When the MS 2 moves from the macro BS 3A "#1" to the femto BS 3B "#1", it is not necessary to perform a location registration updating request for the movement between the same PGs because the MS 2 receives the PGIDs of the PG #1 and the PG #2 informed by the femto BS 3B "#1" (Step S76).

Moreover, when the time of the idle mode timer is up (Step S77), the MS 2 transmits RNG-REQ including the LU request flag to the femto BS 3B "#1" in order to request location registration updating (Step S78).

Upon receiving the RNG-REQ from the MS 2, the femto BS 3B "#1" transmits LU-Req to the ASN-GW 4 that includes the PC unit 24A associated with the PCID of the RNG-REQ (Step S79).

Upon receiving the LU-Req, the ASN-GW 4 detects that the femto BS 3B "#1" that transmits the LU-Req belongs to the PG #2 that is PG common to the femto BSs 3B and the PG #1 that is the same PG as that of the neighboring macro BSs 3A, and also acquires the PGID 32 and the last BSID 33. In this case, the PGID 32 identifies PG just before the location registration request registered in the location registration database 23B corresponding to the MS 2 that requests location registration. The last BSID 33 identifies the BS 3 that performs the final location registration.

When the last BSID 33 acquired from the location registration database 23B is the BS 3 other than the femto BS 3B "#1" that transmits the LU-Req, the ASN-GW 4 determines that the MS 2 is still in the PG #1 and updates and registers the last BSID 33 of identifying the BS 3 that performs the final location registration updating in the location registration database 23B (Step S80). In other words, the ASN-GW 4 updates the present PGID 32 to the PG #1 and the last BSID 33 to the femto BS 3B "#1" and registers the results in the location registration database 23B.

In this case, when the packet for the MS 2 is received, the ASN-GW 4 instructs the macro BSs 3A and the femto BS 3B under the PG #1 to transmit the paging information of the MS 2.

Upon detecting the location registration updating of the MS 2, the ASN-GW 4 informs the femto BS 3B "#1" of LU-Rsp including the PGID of the PG #1 in which the MS 2 exists (Step S81).

Upon receiving the LU-Rsp, the femto BS 3B "#1"informs the MS 2 of RNG-RSP including the PGID of the PG #1 in which the MS 2 exists (Step S82).

Furthermore, when the time of the idle mode timer is up (Step S83), the MS 2 transmits RNG-REQ including the LU request flag to the femto BS 3B "#1" in order to request location registration updating (Step S84).

Upon receiving the RNG-REQ from the MS 2, the femto BS 3B "#1" transmits LU-Req to the ASN-GW 4 that includes the PC unit 24A associated with the PCID of the RNG-REQ (Step S85).

Upon receiving the LU-Req, the ASN-GW 4 detects that the femto BS 3B "#1" that transmits the LU-Req belongs to the PG #2 that is PG common to the femto BSs 3B and the PG #1 that is the same PG as that of the neighboring macro BSs 3A and also acquires the PGID 32 and the last BSID 33. In this case, the PGID 32 identifies PG just before the location registration request registered in the location registration database 23B corresponding to the MS 2 that requests location registration. The last BSID 33 identifies the BS 3 that performs the final location registration.

When the last BSID 33 acquired from the location registration database 23B is the femto BS 3B "#1" that transmits the LU-Req, the ASN-GW 4 determines that the MS 2 is under the PG #2, and updates the last BSID 33 to the BS 3 that performs the final location registration updating and registers the result in the location registration database 23B (Step S86). In other words, the ASN-GW 4 updates the present PGID 32 to the PG #2 and the last BSID 33 to the femto BS 3B "#1" and registers the results in the location registration database 23B.

In this case, when the packet for the MS 2 is received, the ASN-GW 4 instructs the femto BS 3B "#1" of the last BSID 33 under the PG #2 to transmit the paging information of the MS 2.

Upon detecting the location registration updating of the MS 2, the ASN-GW 4 informs the femto BS 3B "#1" of LU-Rsp including the PGID of the PG #2 in which the MS 2 exists (Step S87).

Upon receiving the LU-Rsp, the femto BS 3B "#1" informs the MS 2 of RNG-RSP including the PGID of the PG #2 in which the MS 2 exists (Step S88).

Next, because the MS 2 receives the PGID of the PG #1 informed by the macro BS 3A "#2" when the MS 2 moves from the femto BS 3B "#1" to the macro BS 3A "#2" (Step S89), the MS 2 determines that itself moves from the PG #2 to the PG #1 and transmits the RNG-REQ including the LU request flag to the macro BS 3A "#2" in order to request location registration updating (Step S90).

Upon receiving the RNG-REQ from the MS 2, the macro BS 3A "#2" transmits LU-Req to the ASN-GW 4 that includes the PC unit 24A associated with the PCID of the RNG-REQ (Step S91).

Upon receiving the LU-Req, the ASN-GW 4 updates the present PGID 32 of identifying the present PG registered in the location registration database 23B and the last BSID 33 of identifying the BS 3 that performs the final location registration (Step S92). In other words, the ASN-GW 4 updates the present PGID 32 to the PG #1 of the macro BS 3A "#2" and the last BSID 33 to the macro BS 3A "#2" and registers the results in the location registration database 23B.

In this case, when the packet for the MS 2 is received, the ASN-GW 4 instructs all the macro BSs 3A and the femto BS 3B under the PG #1 to transmit the paging information of the MS 2.

Upon detecting the location registration updating of the MS 2, the ASN-GW 4 informs the macro BS 3A "#2" of LU-Rsp including the PGID of the PG #1 in which the MS 2 exists (Step S93).

Upon receiving the LU-Rsp, the macro BS 3A "#2" informs the MS 2 of RNG-RSP including the PGID of the PG #1 in which the MS 2 exists (Step S94).

As a result, as far as the MS 2 is under the macro BS 3A in the PG #1, it is not necessary to perform the location registration updating process caused by the change of PG. However, the MS 2 naturally performs the location registration updating process in accordance with the time-up of the idle mode timer.

Figure 11:
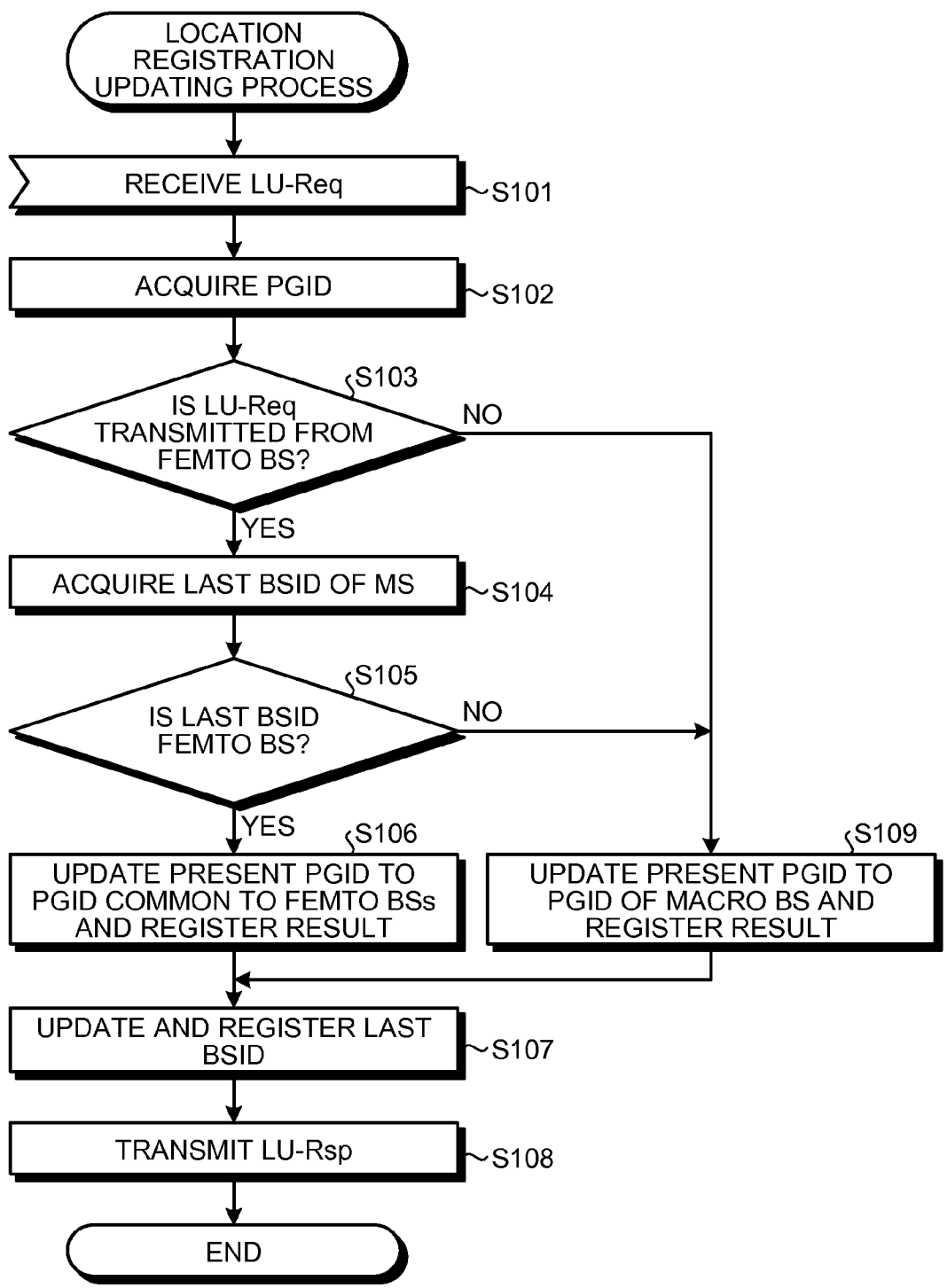
FIG. 11 is a flowchart illustrating processing operations of ASN-GW associated with the location registration updating process.

Next, it will be explained about operations of the ASN-GW 4 associated with the location registration updating process. FIG. 11 is a flowchart illustrating processing operations of the ASN-GW 4 associated with the location registration updating process.

Upon receiving the LU-Req from the BS 3 (Step S101), the ASN-GW 4 illustrated in FIG. 11 acquires the PGID of the BS 3 that transmits the LU-Req (Step S102). The determination whether PGID is the PGID "#2" common to the femto BSs 3B is performed by retrieving the PGID management table 23A that stores a correspondence relationship between the BS 3 and the PGID or by storing the PGID in the LU-Req by the BS 3.

The ASN-GW 4 determines whether the LU-Req is transmitted from the femto BS 3B, on the basis of the PGID acquired at Step S102 (Step S103).

When the LU-Req is transmitted from the femto BS 3B (Step S103: YES), the ASN-GW 4 acquires the last BSID 33 of the MS 2 from the location registration database 23B (Step S104).

The ASN-GW 4 determines whether the last BSID 33 of the MS 2 is the femto BS 3B (Step S105).

When the last BSID 33 is the femto BS 3B (Step S105: YES), the ASN-GW 4 updates the present PGID 32 to the PGID "#2" common to the femto BSs 3B and registers the result in the location registration database 23A (Step S106), and updates the last BSID 33 to the BSID of the BS 3 that transmits the LU-Req and registers the result in the location registration database 23B (Step S107).

The ASN-GW 4 sends back LU-Rsp including necessary information such as PGID and idle mode parameters to the BS 3 that transmits the LU-Req (Step S108), and terminates the processing operations illustrated in FIG. 11.

When the LU-Req is not transmitted from the femto BS 3B (Step S103: NO) or when the last BSID 33 is not the femto BS 3B (Step S105: NO), the ASN-GW 4 determines that BS that transmits LU-Req is the macro BS 3A around the macro BS 3B. The ASN-GW 4 updates the present PGID 32 to the PGID of the macro BS 3A and register the result in the location registration database 23B (Step S109), and moves the process control to Step S107 in order to update the last BSID 33 to the BSID of the BS 3 that transmits the LU-Req and register the result in the location registration database 23B.

According to the second embodiment, among the plurality of BSs 3, the geographically adjacent macro BSs 3A are set in the PG #1, the femto BS 3B is set in the PG #2 common to the femto BSs 3B and the same PG #1 as that of the neighboring macro BSs 3A, and the PGID 32 of identifying the PG of the BS 3 in which the MS 2 is currently located and the last BSID 33 of the BS 3 that performs the final location registration of the MS 2 are registered in the location registration database 23B when the location registration request of the MS 2 is detected in PG. Therefore, the management burdens of PGs to be set in the femto BS 3B can be largely reduced by attempting large reduction of the number of PGs that are set in only the femto BS 3B.

Moreover, according to the second embodiment, the last BSID 33 of the MS 2 is acquired from the location registration database 23B when the BS 3 that transmits LU-Req is the PGID #2 common to the femto BSs 3B, and the present PGID 32 is updated to the PGID "#2" common to the femto BSs 3B and the last BSID 33 is updated to the BSID of the BS 3 that transmits the LU-Req to register the results in the location registration database 23B when the last BSID 33 of the MS 2 is the femto BS 3B. Therefore, the position information of the MS 2 can be smoothly updated.

Moreover, according to the second embodiment, the present PGID 32 is updated to the PGID of the BS 3 (the macro BS 3A) and the last BSID 33 is updated to the BSID of the BS 3 to register the results in the location registration database 23B when the BS 3 that transmits LU-Req is not the PGID #2 common to the femto BSs 3B. Therefore, the position information of the MS 2 can be smoothly updated.

Moreover, according to the second embodiment, the last BSID 33 of the MS 2 is acquired from the location registration database 23B when the BS 3 that transmits LU-Req is the PGID #2 common to the femto BSs 3B, and the present PGID 32 is updated to the PGID of the BS 3 (the macro BS 3A) and the last BSID 33 is updated to the BSID of the BS 3 that transmits the LU-Req to register the results in the location registration database 23B when the last BSID 33 of the MS 2 is not the femto BS 3B. Therefore, the position information of the MS 2 can be smoothly updated.

Moreover, according to the second embodiment, the PGID 32 corresponding to the present position of the MS 2 is acquired from the location registration database 23B when a packet for the MS 2 is received, and the paging information of the MS 2 is transmitted to all the BSs 3 (the macro BSs 3A and the femto BS 3B) under the PG #1 when the present PGID of the MS 2 is the PG #1. Therefore, a data delivery amount required for transmitting paging information can be largely reduced compared with the case where the macro BSs 3A and the femto BS 3B are set in the same PG.

Moreover, according to the second embodiment, the PGID 32 corresponding to the present position of the MS 2 is acquired from the location registration database 23B when a packet for the MS 2 is received, the last BSID 33 of the MS 2 is acquired from the location registration database 23B when the acquired present PGID of the MS 2 is the PG #2, and the paging information of the MS 2 is transmitted to only the femto BS 3B of the acquired last BSID 33. Therefore, a data delivery amount required for transmitting paging information can be largely reduced and at the same time stable paging control can be realized, compared with the case where the macro BSs 3A and the femto BS 3B are set in the same PG. Moreover, because the paging information of the MS 2 does not have to be delivered to all the femto BSs 3B under the PG #2, the transmission of useless paging information can be avoided and a bandwidth waste caused by the transmission of paging information on the Internet 5 performed by the femto BS 3B can be avoided.

Moreover, according to the second embodiment, the macro BSs 3A and the femto BS 3B are in the same PG #1 even when the MS 2 passes the macro BS 3A->the femto BS 3B->the macro BS 3A. Therefore, because location registration updating caused by the change of PG is not performed due to only the passing of the femto BS 3B, processing burdens required for location registration updating of the wireless communication system 1A can be largely reduced. As a result, because the number of the position registrations of the MS 2 is decreased, the power consumption of the MS 2 can be reduced.

Moreover, according to the second embodiment, because the femto BS 3B belongs to PG common to the femto BSs 3B and further belongs to the same PG as that of the neighboring macro BSs 3A, it is considered that paging information for the large number of MSs 2 that are under the same PG of the neighboring macro BSs 3A is transmitted to the femto BS 3B and thus a data delivery amount required for transmitting the paging information is increased.

Third Embodiment

Now, a wireless communication system that deals with the above situation will be explained as the third embodiment. The same configuration as that of the wireless communication system 1A of the second embodiment illustrated in FIG. 9 has the same reference number, and the explanations of the same configuration and operation are omitted.

In the wireless communication system according to the third embodiment, when the macro BSs 3A and the femto BS 3B are in the same PG, paging information of the MS 2 is continuously transmitted through all the macro BSs 3A in the same PG for a predetermined time even if the MS 2 is in the same PG and then the paging information of the MS 2 is transmitted through the femto BS 3B in the same PG when a response to paging information is not detected in a predetermined time.

Figure 12:
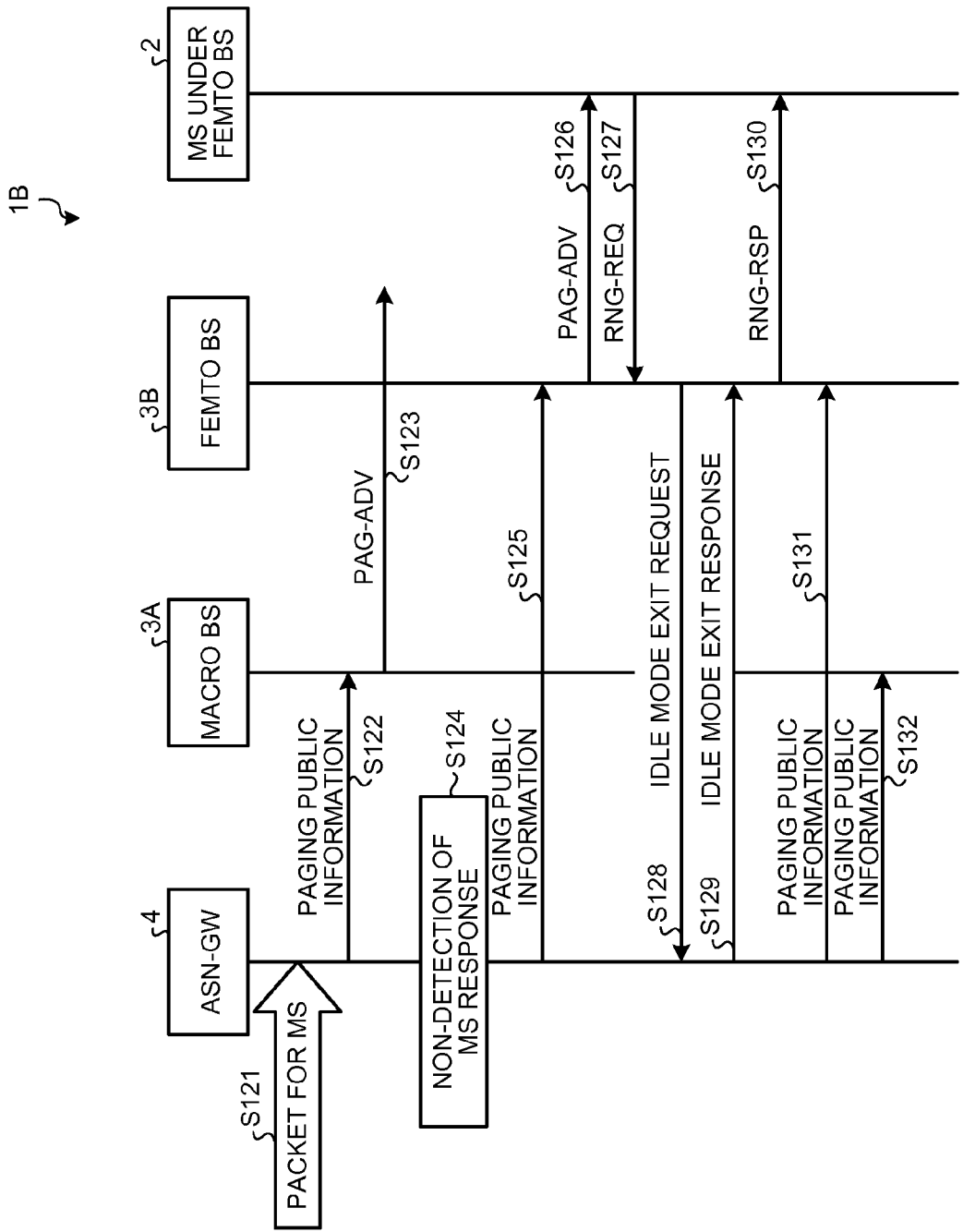
FIG. 12 is an operating sequence diagram illustrating processing operations of a wireless communication system associated with a paging process according to a third embodiment.

FIG. 12 is an operating sequence diagram illustrating processing operations of a wireless communication system 1B associated with a paging process according to the third embodiment.

The paging process illustrated in FIG. 12 is a process when paging information is transmitted to the MS 2 under the femto BS 3B in the same PG in which the femto BS 3B and the macro BSs 3A exist together.

When a packet for the MS 2 during an idle mode is received (Step S121), the ASN-GW 4 illustrated in FIG. 12 retrieves the PGID 32 corresponding to the MS 2 from the location registration database 23B.

When the PGID 32 corresponding to the MS 2 is acquired on the basis of the result of retrieval, the ASN-GW 4 transmits paging public information that indicates the transmission of paging information to all the macro BSs 3A excluding the femto BS 3B among all the BSs 3 under the PG of the PGID 32 (Step S122). In this case, paging public information includes a start code that indicates a paging start and a paging monitoring timer that monitors a paging continuing time, in addition to information (paging parameters such as a MAC address of the MS 2, a paging period, and a paging offset) associated with the MS 2 that is a paging target.

Moreover, a timer time of the paging monitoring timer corresponds to a duration time for which the BS 3 transmits paging information (PAG-ADV) of the MS 2. In other words, the BS 3 continues to transmit the paging information (PAG-ADV) of the MS 2 with a paging period until a time of the paging monitoring timer is up.

Upon receiving the paging public information from the ASN-GW 4 at Step S122, each of the macro BSs 3A transmits the paging information (PAG-ADV) of the MS 2 to the underneath MS 2 (Step S123).

Moreover, after transmitting paging public information to the BS 3 under the same PG, the ASN-GW 4 monitors the transmission of the paging information (PAG-ADV) to the underneath MS 2 performed by the BS 3, the reception of RNG-REQ for the paging information performed by the BS 3, and the transmission of an idle mode exit request for the RNG-REQ performed by the BS 3.

For example, when a response of the MS 2 to the paging information is detected through the macro BS 3A, the ASN-GW 4 transmits paging public information including a stop code to all the macro BSs 3A in the same PG.

In this case, it has been explained about the case where the ASN-GW 4 transmits paging public information including a stop code to all the macro BSs 3A in the same PG. However, the macro BS 3A that receives the response of the MS 2 may be excluded among all the macro BSs 3A.

On the other hand, when a response to the paging information is not detected through the macro BS 3A (Step S124) after the paging information is transmitted to the underneath MS 2 through all the macro BSs 3A in the same PG at Step S123, the ASN-GW 4 transmits the paging public information to the femto BS 3B in the same PG (Step S125). In this case, paging public information is contents that are obtained by excepting the information of the MS 2 that sends the response via the macro BS 3A from the paging public information delivered to the macro BS 3A.

Upon receiving the paging public information at Step S125, the femto BS 3B transmits the paging information (PAG-ADV) to the underneath MS 2 (Step S126).

When the RNG-REQ corresponding to the response of the MS 2 to the paging information is received (Step S127), the femto BS 3B informs the ASN-GW 4 of an idle mode exit request (Step S128).

Upon receiving the idle mode exit request, the ASN-GW 4 informs the femto BS 3B of an idle mode exit response to the idle mode exit request (Step S129).

Upon receiving the idle mode exit response, the femto BS 3B informs the MS 2 of RNG-RSP to RNG-REQ (Step S130) and starts communication with the MS 2.

Furthermore, after the idle mode exit response is transmitted to the femto BS 3B, the ASN-GW 4 informs the femto BS 3B and the macro BSs 3A of paging public information including a stop code indicative of a paging stop (Step S131 and 132), and terminates the processing operations illustrated in FIG. 12.

Upon receiving the paging public information including a stop code, the macro BSs 3A and the femto BS 3B in the same PG stop transmitting the paging information (PAG-ADV) to the underneath MS 2.

The ASN-GW 4 sets a paging monitoring timer, which includes the number of transmissions of the paging information (PAG-ADV) for calling the MS 2 to the femto BS 3B in the start code of the paging public information, to be short, for example, to be restricted to once or twice, and thus a transmission stop by paging public information including a stop code may be omitted. In this case, further message transmission for controlling the femto BS 3B can be prevented.

A start timing of the ASN-GW 4 at which the paging public information including a start code is transmitted to the femto BS 3B corresponds to a timing after the passage of a time for which the idle exit request accompanied with the response of the MS 2 to the paging information can be sufficiently received at the ASN-GW 4 by way of the macro BS 3A after the paging public information is transmitted to the macro BS 3A.

In the present invention, synchronization between the ASN-GW 4 and the BS 3 is required. In a system that does not have synchronization between both, the BS 3 may first transmit the paging information (PAG-ADV) and then transmit a message for informing of the transmission of the paging information (PAG-ADV) to the ASN-GW 4.

Moreover, when a time at which the BS 3 first informs the underneath MS 2 of the paging information (PAG-ADV) cannot be accurately detected, the ASN-GW 4 transmits paging public information including a start code to the BS 3 and then transmits paging public information including a start code to the femto BS 3B after the passage of a time that is obtained by adding a time corresponding to a paging period and a time corresponding to a round trip time from the ASN-GW 4 to the MS 2. In this case, a round trip time corresponds to a time for which the paging public information is transmitted to the BS 3 at the ASN-GW 4, the paging information (PAG-ADV) is transmitted to the MS 2 at the BS 3, the RNG-REQ of the MS 2 at the BS 3 is received, and the idle mode exit request is received from the BS 3 at the ASN-GW 4.

Figure 13:
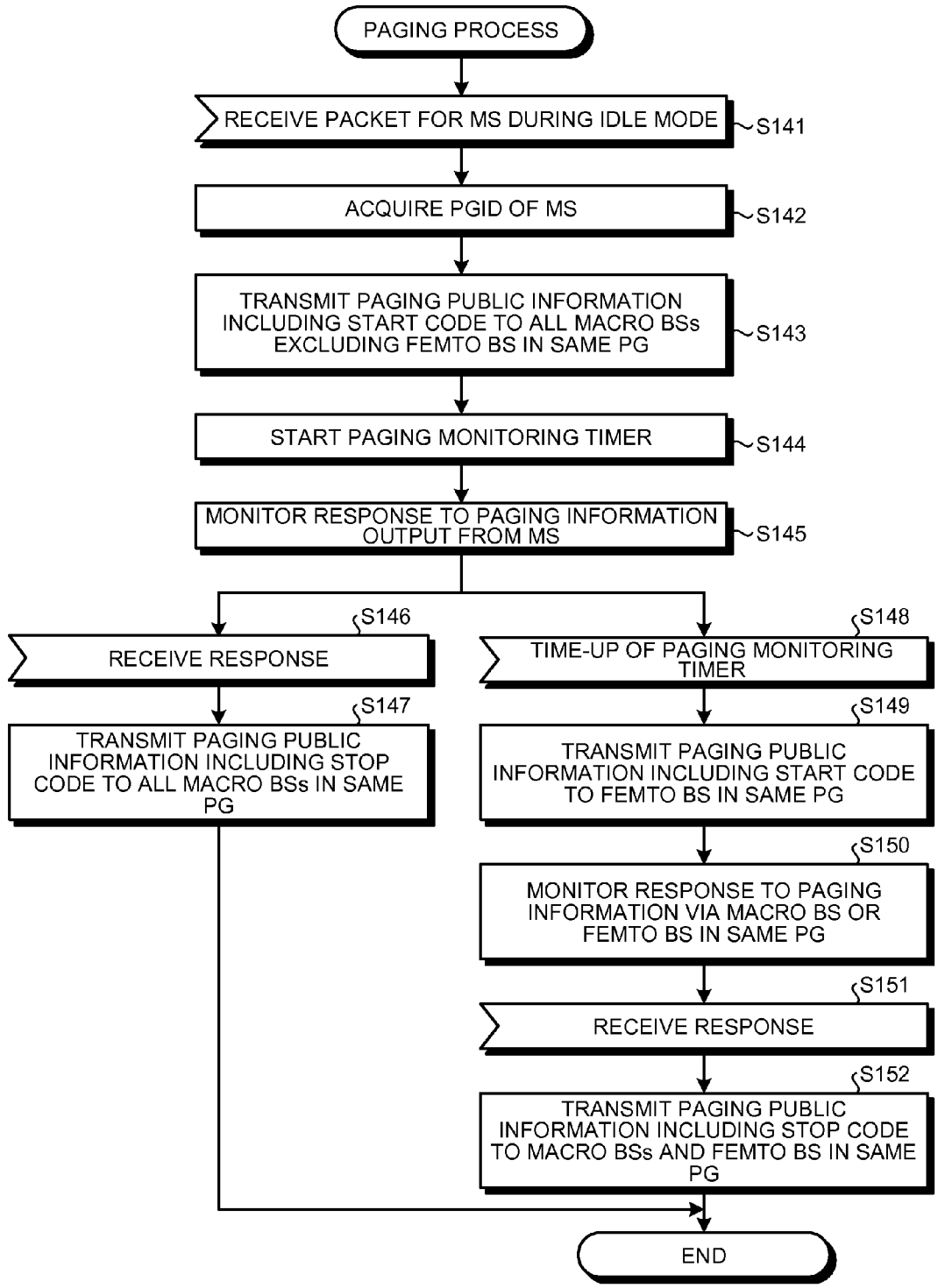
FIG. 13 is a flowchart illustrating processing operations of ASN-GW associated with the paging process.
Figure 14:
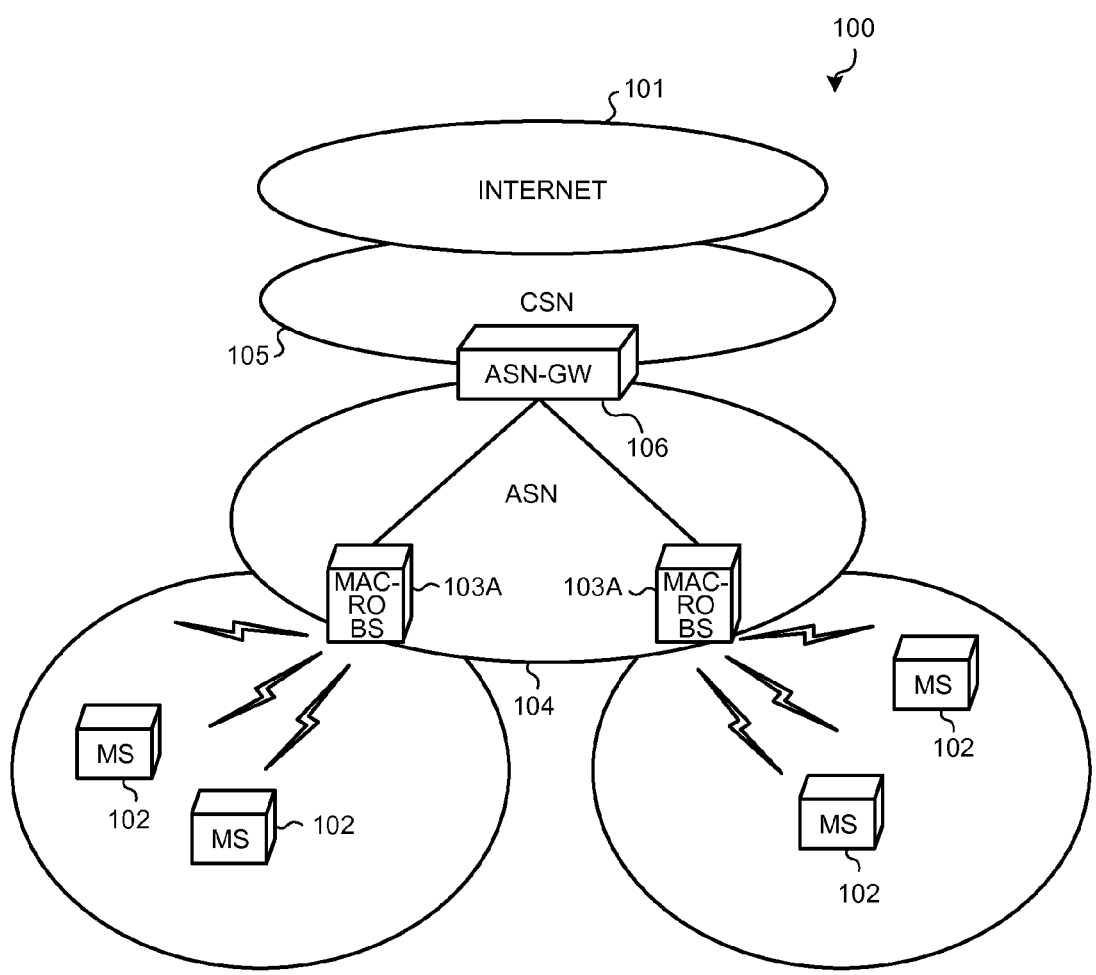
FIG. 14 is a block diagram illustrating the schematic configuration of a wireless communication system that employs IEEE 802.16d/e.
Figure 15:
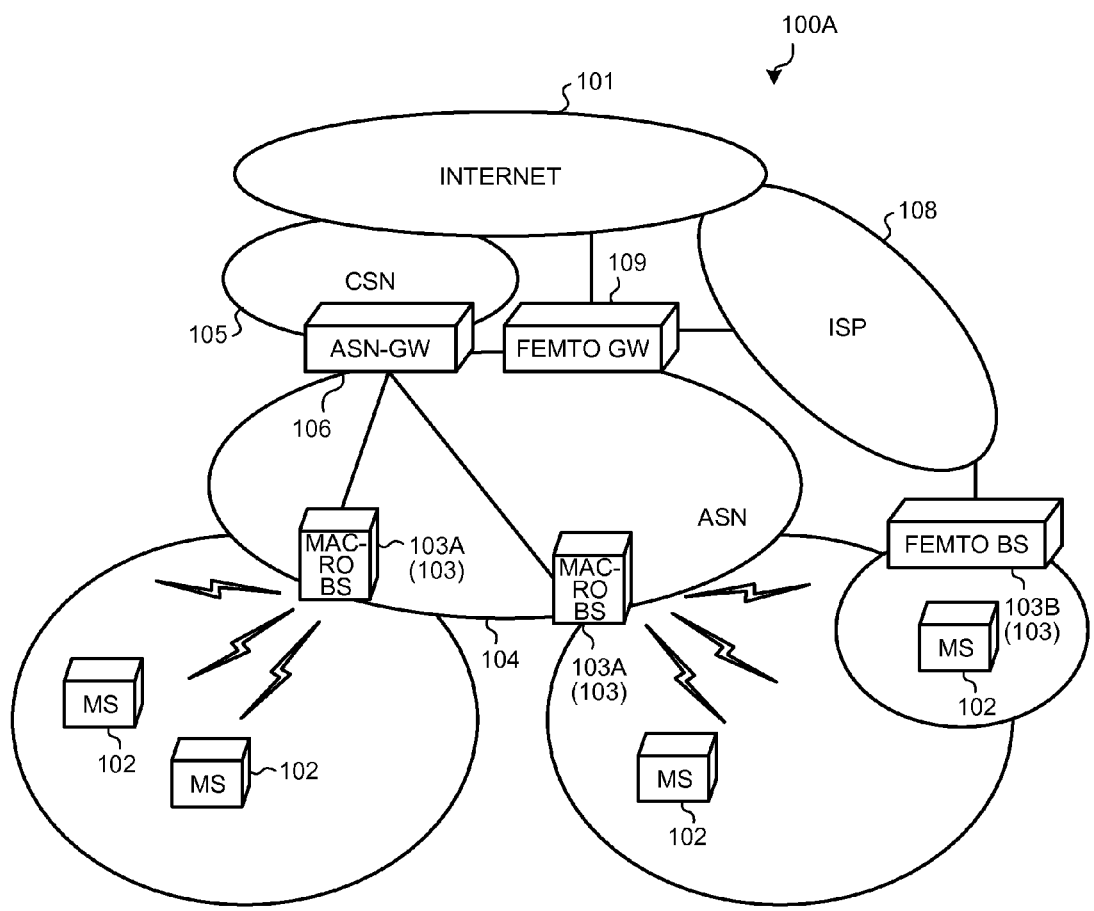
FIG. 15 is a block diagram illustrating the schematic configuration of the wireless communication system that uses a femto BS.
Figure 16:
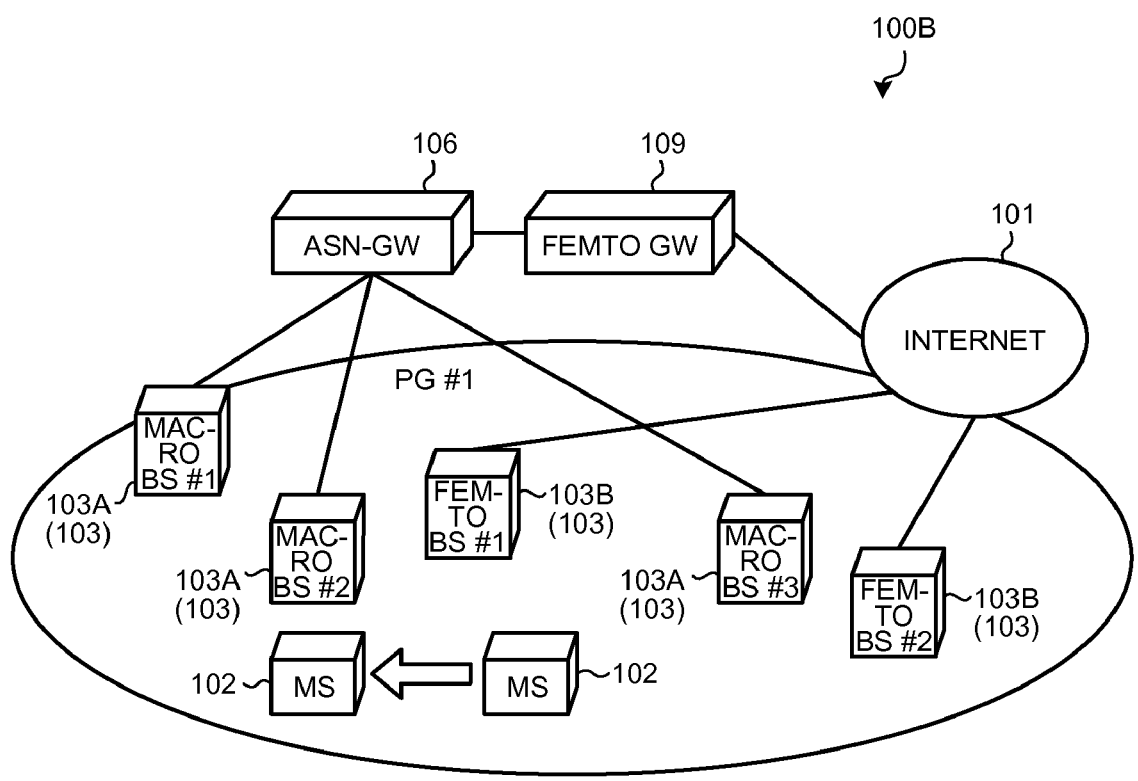
FIG. 16 is a block diagram illustrating the schematic configuration of the wireless communication system that uses the femto BS.
Figure 17:
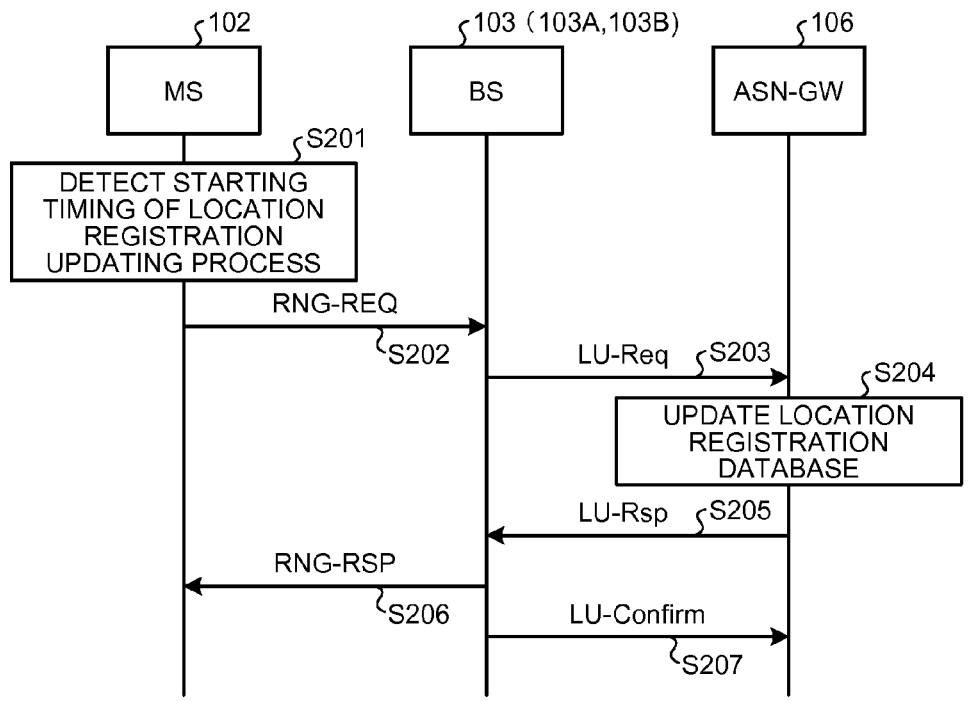
FIG. 17 is an operating sequence diagram illustrating processing operations of the wireless communication system associated with a basic location registration updating process.
Figure 18:
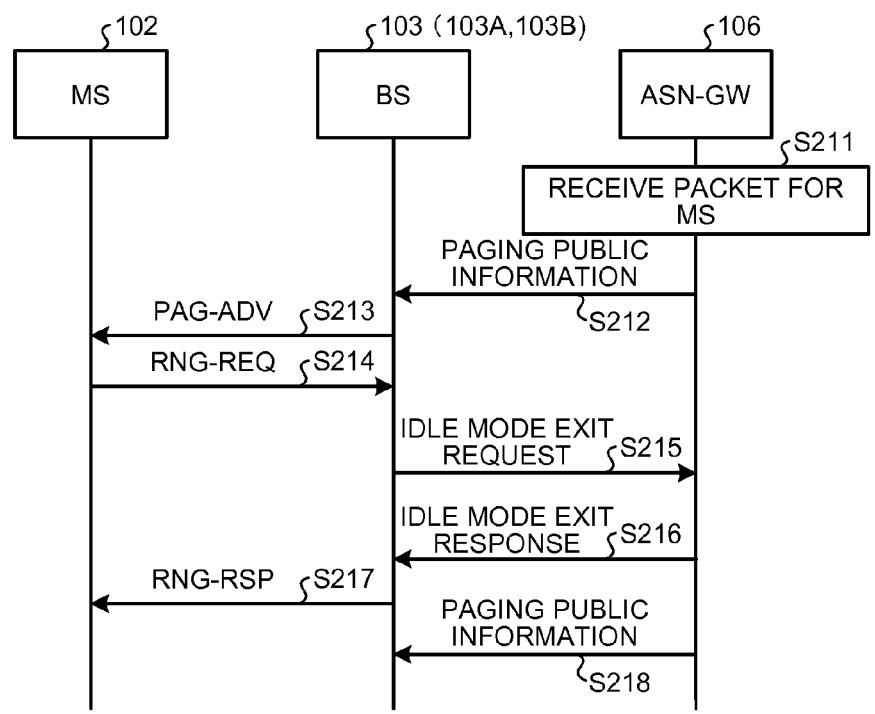
FIG. 18 is an operating sequence diagram illustrating processing operations of the wireless communication system associated with a basic paging process.
Figure 19:
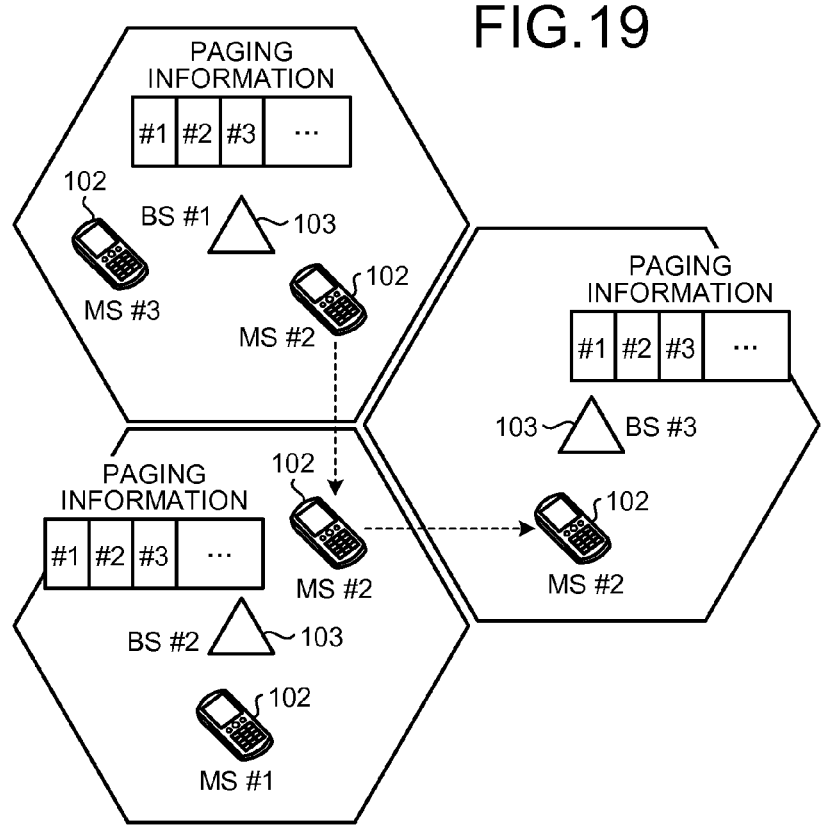
FIG. 19 is an explanation diagram plainly illustrating a normal paging function associated with each BS in the same PG.
Figure 20:
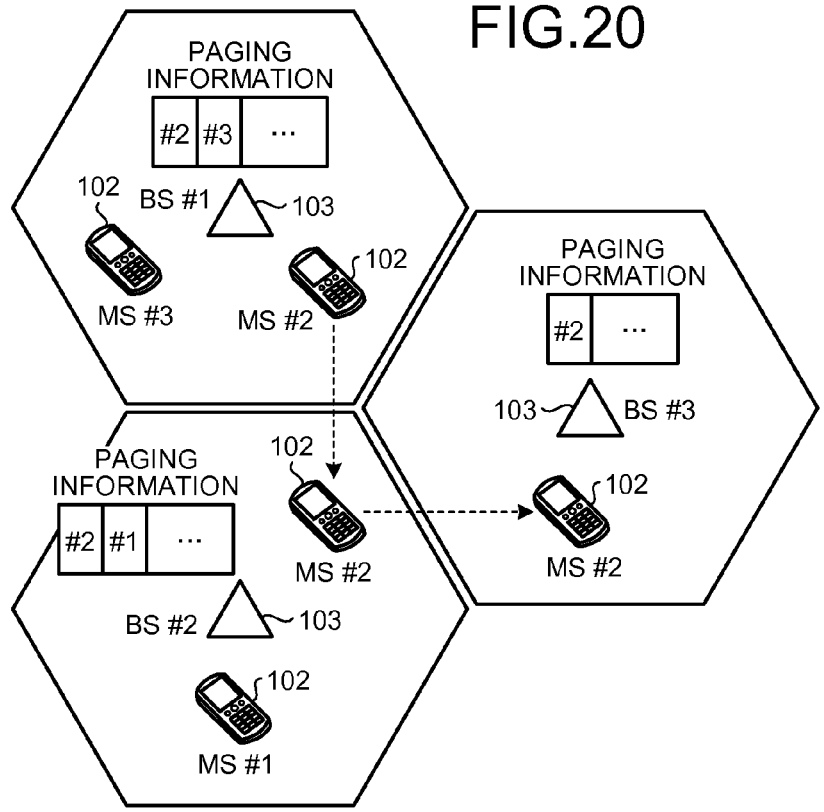
FIG. 20 is an explanation diagram plainly illustrating a location based paging function associated with each BS in the same PG.

Next, it will be explained about operations of the ASN-GW 4 associated with a paging process. FIG. 13 is a flowchart illustrating processing operations of the ASN-GW 4 associated with a paging process.

The paging process illustrated in FIG. 13 is a process, at the ASN-GW 4, for transmitting paging information (PAG-ADV) of the macro BS 3A or the femto BS 3B on the basis of paging public information including a start code or a stop code. In this case, there is illustrated a case where a timing at which the ASN-GW 4 transmits paging public information including a start code to the femto BS 3B is a timing at which a time, which is obtained by adding a time corresponding to the paging period and a time corresponding to the round trip time from the ASN-GW 4 to the MS 2, is passed after the paging public information including a start code is transmitted to the macro BS 3A.

When a packet for the MS 2 during an idle mode is received (Step S141), the ASN-GW 4 illustrated in FIG. 13 specifies the MS 2 that is a packet transmission destination on the basis of an IP address included in a header of the packet, and acquires the present PGID in which the specified MS 2 exists from the location registration database 23B (Step S142).

The ASN-GW 4 transmits paging public information including a start code that indicates a transmission start of paging information (PAG-ADV) of the MS 2 to the macro BSs 3A excluding the femto BS 3B among all the BSs 3 in the PG (Step S143), and starts a clocking operation of the paging monitoring timer (Step S144).

The ASN-GW 4 monitors a response (RNG-REQ) of the MS 2 to the paging information by way of the macro BS 3A until the time of the paging monitoring timer is up (Step 145).

When the response (RNG-REQ) of the MS 2 to the paging information is received by way of the macro BS 3A (Step S146), the ASN-GW 4 transmits paging public information including a stop code to the macro BSs 3A excluding the femto BS 3B among all the BSs 3 in the same PG (Step S147), and then terminates the processing operations illustrated in FIG. 13.

On the other hand, when the time of the paging monitoring timer is up during monitoring the response to the paging information at Step S135 (Step S148), the ASN-GW 4 transmits, to the femto BS 3B in the same PG, the paging public information including a start code that indicates a transmission start of the paging information (PAG-ADV) of the MS 2 that does not respond (Step S149).

After transmitting the paging public information including a start code to the femto BS 3B, the ASN-GW 4 monitors a response of the MS 2 to the paging information via the macro BS 3A or the femto BS 3B in the same PG (Step 150). When the response of the MS 2 to the paging information is received by way of the macro BS 3A or the femto BS 3B (Step S151), the ASN-GW 4 transmits the paging public information including a stop code that indicates a transmission stop of the paging information (PAG-ADV) to the macro BSs 3A and the femto BS 3B in the same PG (Step S152), and then terminates the processing operations illustrated in FIG. 13.

According to the third embodiment, when a packet for the MS 2 in PG in which the macro BSs 3A and the femto BS 3B exist together is received, the paging information of the MS 2 is transmitted through all the macro BSs 3A excepting the femto BS 3B among all the BSs 3 in the same PG, and then the paging information of the MS 2 is transmitted to the femto BS 3B in the same PG when there is not a response to the paging information in the timer time of the paging monitoring timer. As a result, because the transmission of useless paging information to the femto BS 3B is avoided as much as possible even when the packet for the MS 2 in the PG in which the macro BSs 3A and the femto BS 3B exist together is received, a data delivery amount required for transmitting paging information can be largely reduced and also a bandwidth waste caused by the transmission of paging information on the Internet 5 performed by the femto BS 3B can be avoided.

According to the third embodiment, a timer time of the paging monitoring timer corresponds to a time period from transmitting the paging information of the MS 2 through the macro BS 3A to recognizing a response to the paging information of the MS 2 by way of the macro BS 3A. Therefore, the macro BS 3A can monitor the response of the MS 2 to the paging information at least during the timer time.

Moreover, according to the third embodiment, a transmission continuation time for which the paging information of the MS 2 is periodically transmitted through the macro BS 3A may be set in accordance with the macro BS 3A for which the delay of the ASN-GW 4 is short, and a transmission continuation time for which the paging information of the MS 2 is periodically transmitted through the femto BS 3B may be set in accordance with the femto BS 3B for which the delay of the ASN-GW 4 is long. In this case, a time-out time of paging information according to the characteristics of the macro BS 3A and the femto BS 3B can be set.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. Moreover, effects described in the present embodiments are not limited to these.

Moreover, among the processes described in the present embodiments, the whole or a part of processes that have been automatically performed can be manually performed. Alternatively, the whole or a part of processes that have been manually performed can be automatically performed. Also, processing procedures, control procedures, concrete titles, and information including various types of data and parameters, which are described in the present embodiments, can be arbitrarily changed except that they are specially mentioned.

Each component of each device illustrated in the drawings is a functional concept. Therefore, these components are not necessarily constituted physically as illustrated in the drawings. In other words, the specific configuration of each device is not limited to the illustrated configuration.

Furthermore, all or a part of the process functions performed by each device may be realized by a CPU (Central Processing Unit) (or microcomputer such as MPU (Micro Processing Unit) or MCU (Micro Controller Unit)) and a program that is analyzed and executed by the CPU (or microcomputer such as MPU or MCU), or may be realized by a hardware by wired logic.

The invention claimed is:

1. A communication control apparatus for controlling communication of a plurality of base stations of which each wirelessly accommodates a mobile subscriber, the communication control apparatus comprising:

a group setting unit that sets a normal group for normal base stations among the plurality of base stations and a specified group for specified base stations different from the normal base stations among the plurality of base stations;

a location registration managing unit that manages, for each mobile subscriber, group identification information of identifying a group of the base stations corresponding to a present position of the mobile subscriber and last base station identification information of identifying a base station that performs final location registration of the mobile subscriber;

a paging control unit that acquires, upon receiving data for the mobile subscriber, the group identification information corresponding to the mobile subscriber from the location registration managing unit and transmits paging information of the mobile subscriber through all the normal base stations of the normal group when the acquired group identification information is the normal group and that acquires, upon receiving data for the mobile subscriber, the group identification information corresponding to the mobile subscriber from the location registration managing unit, acquires the last base station identification information corresponding to the mobile subscriber from the location registration managing unit when the acquired group identification information is the specified group, and transmits paging information of the mobile subscriber through the specified base station of the acquired last base station identification information; and a location registration unit that performs location registration that the mobile subscriber belongs to the base station that transmits a location registration request of the mobile subscriber when the mobile subscriber transmits the location registration request to the base station in detecting, on the basis of the base station identification information of identifying the base station under which the mobile subscriber is currently located, a movement from the base station in the specified group to another base station in the same specified group.

2. The communication control apparatus according to claim 1, wherein the mobile subscriber detects base station identification information of identifying a base station under which the mobile subscriber is currently located and detects that the mobile subscriber moves to a new base station on the basis of the detected base station identification information.

3. The communication control apparatus according to claim 1, wherein the group setting unit sets, at the same time as setting the specified group for the specified base station, the normal group of the normal base station geographically adjacent to the specified base station, and the location registration unit that performs location registration that the mobile subscriber belongs to a base station in the specified group when the base station that transmits a location registration request of the mobile subscriber is the specified base station and when the base station that performs final location registration of the mobile subscriber is the specified base station, and performs location registration that the mobile subscriber belongs to a base station in the normal group when the base station that transmits a location registration request of the mobile subscriber is not the specified base station or when the base station that transmits a location registration request of the mobile subscriber is the specified base station and when the base station that performs final location registration of the mobile subscriber is not the specified base station.

4. The communication control apparatus according to claim 3, wherein the paging control unit transmits, upon receiving data for the mobile subscriber under a base station in a group in which the normal base station and the specified base station exist together, paging information of the mobile subscriber through all the normal base stations excepting the specified base station among all the base stations in the group, and transmits the paging information of the mobile subscriber through the specified base station in the group when a response of the mobile subscriber is not detected in a predetermined time.

5. The communication control apparatus according to claim 4, wherein the predetermined time corresponds to a time period from transmitting the paging information of the mobile subscriber through the normal base station to recognizing a response of the mobile subscriber to the paging information by way of the normal base station.

6. The communication control apparatus according to claim 5,
wherein a length of a transmission continuation time for which the paging information of the mobile subscriber is periodically transmitted through the normal base station and a length of a transmission continuation time for which the paging information of the mobile subscriber is periodically transmitted through the specified base station are set to be different.

7. The communication control apparatus according to claim 1,
wherein the specified base station is connected by way of a network different from that of the normal base station.

8. A communication control method for controlling communication of a plurality of base stations of which each wirelessly accommodates a mobile subscriber,
the communication control method comprising:
setting a normal group for normal base stations among the plurality of base stations and a specified group for specified base stations different from the normal base stations among the plurality of base stations;
managing, for each mobile subscriber in a location registration managing unit, group identification information of identifying a group of the base stations corresponding to a present position of the mobile subscriber and last base station identification information of identifying a base station that performs final location registration of the mobile subscriber;
acquiring, upon receiving data for the mobile subscriber, the group identification information corresponding to the mobile subscriber from the location registration managing unit, transmitting paging information of the mobile subscriber through all the normal base stations of the normal group when the acquired group identification information is the normal group, and acquiring, upon receiving data for the mobile subscriber, the group identification information corresponding to the mobile subscriber from the location registration managing unit, acquiring the last base station identification information corresponding to the mobile subscriber from the location registration managing unit when the acquired group identification information is the specified group, and transmitting paging information of the mobile subscriber through the specified base station of the acquired last base station identification information; and
performing location registration that the mobile subscriber belongs to the base station that transmits a location registration request of the mobile subscriber when the mobile subscriber transmits the location registration request to the base station in detecting, on the basis of the base station identification information of identifying the base station under which the mobile subscriber is currently located, a movement from the base station in the specified group to another base station in the same specified group.

9. A non-transitory computer readable recording medium having stored therein a communication control program for controlling communication of a plurality of base stations of which each wirelessly accommodates a mobile subscriber, the communication control program causing a computer to execute a process comprising:
setting a normal group for normal base stations among the plurality of base stations and a specified group for specified base stations different from the normal base stations among the plurality of base stations;
managing, for each mobile subscriber in a location registration managing unit, group identification information of identifying a group of the base stations corresponding to a present position of the mobile subscriber and last base station identification information of identifying a base station that performs final location registration of the mobile subscriber;
acquiring, upon receiving data for the mobile subscriber, the group identification information corresponding to the mobile subscriber from the location registration managing unit, transmitting paging information of the mobile subscriber through all the normal base stations of the normal group when the acquired group identification information is the normal group, acquiring, upon receiving data for the mobile subscriber, the group identification information corresponding to the mobile subscriber from the location registration managing unit, acquiring the last base station identification information corresponding to the mobile subscriber from the location registration managing unit when the acquired group identification information is the specified group, and transmitting paging information of the mobile subscriber through the specified base station of the acquired last base station identification information; and
performing location registration that the mobile subscriber belongs to the base station that transmits a location registration request of the mobile subscriber when the mobile subscriber transmits the location registration request to the base station in detecting, on the basis of the base station identification information of identifying the base station under which the mobile subscriber is currently located, a movement from the base station in the specified group to another base station in the same specified group.

\* \* \* \* \*